United States Patent
Inoue et al.

(10) Patent No.: US 8,838,400 B2
(45) Date of Patent: Sep. 16, 2014

(54) OPERATIONAL STATUS DETERMINATION DEVICE AND OPERATIONAL STATUS DETERMINATION METHOD

(75) Inventors: Tsuyoshi Inoue, Nara (JP); Jun Ozawa, Nara (JP)

(73) Assignee: Panasonic Corporation, Osaka (JP)

( * ) Notice: Subject to any disclaimer, the term of this patent is extended or adjusted under 35 U.S.C. 154(b) by 522 days.

(21) Appl. No.: 13/220,130

(22) Filed: Aug. 29, 2011

(65) Prior Publication Data
US 2011/0313693 A1 Dec. 22, 2011

(30) Foreign Application Priority Data
Feb. 2, 2010 (JP) ................................. 2010-021667

(51) Int. Cl.
*G01R 31/00* (2006.01)
*G06Q 10/06* (2012.01)

(52) U.S. Cl.
CPC ...................................... *G06Q 10/06* (2013.01)
USPC ........................................................ 702/61

(58) Field of Classification Search
CPC ......... Y04S 20/32; Y04S 20/40; Y04S 20/52; G01R 21/133; G01R 22/00; G01R 22/10; G06Q 50/06
See application file for complete search history.

(56) References Cited

U.S. PATENT DOCUMENTS

| 5,862,391 A * | 1/1999 | Salas et al. ..................... 713/300 |
| 2008/0177678 A1* | 7/2008 | Di Martini et al. ........... 705/412 |

FOREIGN PATENT DOCUMENTS

| JP | 2001-152499 | 6/2001 |
| JP | 2003-348669 | 12/2003 |
| JP | 2004-86383 | 3/2004 |
| JP | 2005-295714 | 10/2005 |
| JP | 2006-319536 | 11/2006 |
| JP | 2007-259647 | 10/2007 |

OTHER PUBLICATIONS

International Search Report issued Mar. 15, 2011 which is the priority application of International (PCT) Application No. PCT/JP/2010/007190.
Yuichiro Ezure, "Sentan Kankyo Gijutsu Kateinai Denryoku Sokutei System no Shisaku Kaihatsu Oyobi Jissho Jikken", NEC Technical Journal, vol. 62, No. 3, Sep. 25, 2009, pp. 113-116.
Makoto Iwata, "Sentan Kankyo Gijutsu Katei ya Office no 'Mottainai' Denryoku o Setsuyaku suru 'Green Tap'", NEC Technical Journal, vol. 62, No. 3, Sep. 25, 2009, pp. 92-95.

* cited by examiner

*Primary Examiner* — Elias Desta
(74) *Attorney, Agent, or Firm* — Wenderoth, Lind & Ponack, LLP

(57) ABSTRACT

An operation status determination device includes: a receiving unit which receives a value, as power consumption data, from which power consumption of an appliance is derivable, the power consumption being measured at predetermined time intervals; a specification unit which specifies operation start times of the appliance, based on the power consumption data received by the receiving unit; and a determination unit which determines whether or not the appliance starts operating automatically, based on each of occurrence frequencies of the operation start times specified by the specification unit.

32 Claims, 23 Drawing Sheets

FIG. 1
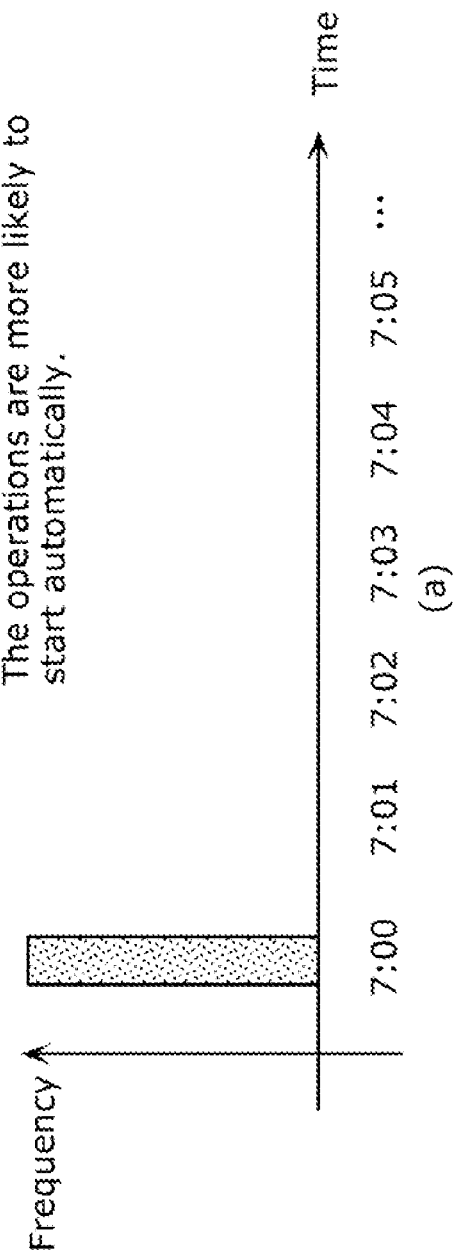
(a)
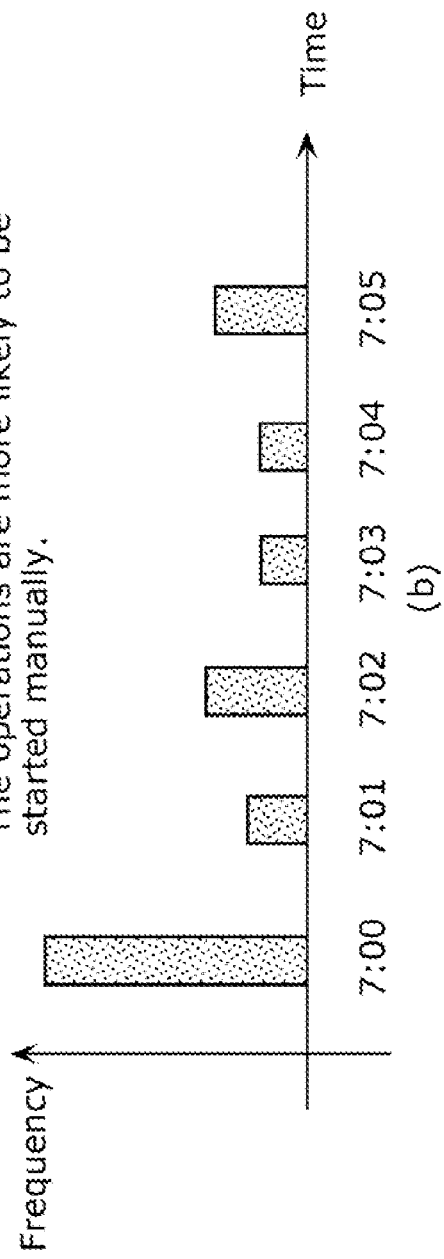
(b)

FIG. 6

| Measurement date ~401 | Measurement day ~402 | Measurement time ~403 | Power consumption of appliance with ID "1" (W) ~404 | Power consumption of appliance with ID "2" (W) ~405 | ... |
|---|---|---|---|---|---|
| 2009/9/2 | Wednesday | 19:00:10 | 125 | 0 | ... |
| 2009/9/2 | Wednesday | 19:00:20 | 128 | 0 | ... |
| 2009/9/2 | Wednesday | 19:00:30 | 120 | 0 | ... |
| 2009/9/2 | Wednesday | 19:00:40 | 126 | 52 | ... |
| 2009/9/2 | Wednesday | 19:00:50 | 126 | 38 | ... |
| 2009/9/2 | Wednesday | 19:01:00 | 146 | 42 | ... |
| 2009/9/2 | Wednesday | 19:01:10 | 118 | 45 | ... |
| 2009/9/2 | Wednesday | 19:01:20 | 120 | 37 | ... |
| 2009/9/2 | Wednesday | 19:01:30 | 125 | 40 | ... |
| 2009/9/2 | Wednesday | 19:01:40 | 137 | 41 | ... |
| 2009/9/2 | Wednesday | 19:01:50 | 128 | 37 | ... |
| ... | | | ... | ... | ... |

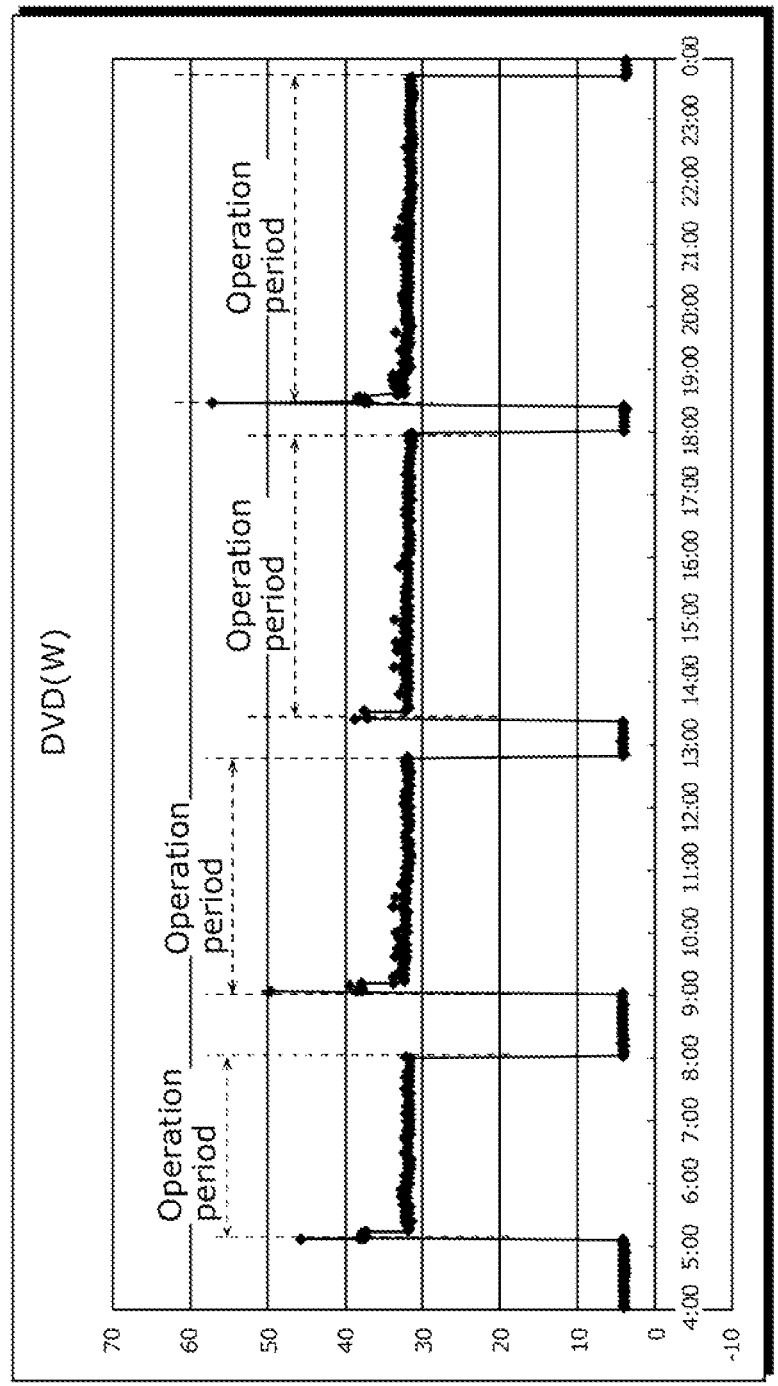

FIG. 9A

| Period No. 701 | Operation date 702 | Operation day 703 | Appliance ID 1 704 | | | | | | Appliance ID 2 |
|---|---|---|---|---|---|---|---|---|---|
| | | | Operation start time 705 | Operation end time 706 | Operation period length (seconds) 707 | power consumption (W) 708 | Number of occurrences of low power consumption 709 | Starting status/ Ending status 710 | |
| 1 | 2009/9/2 | Wednesday | 06:05:10 | 06:30:40 | 1530 | 126 | 0 | Manual/ Manual | ... |
| 2 | ... | ... | ... | ... | ... | ... | ... | ... | ... |
| . | . | . | . | . | . | . | . | . | . |

FIG. 11

| Time of day (in minutes) /901 | Number of started operation periods /902 | Number of ended operation periods /903 |
|---|---|---|
| 7:00 | 28 | 0 |
| 7:01 | 3 | 0 |
| 7:02 | 2 | 0 |
| . | . | . |
| . | . | . |
| : | : | : |

FIG. 13

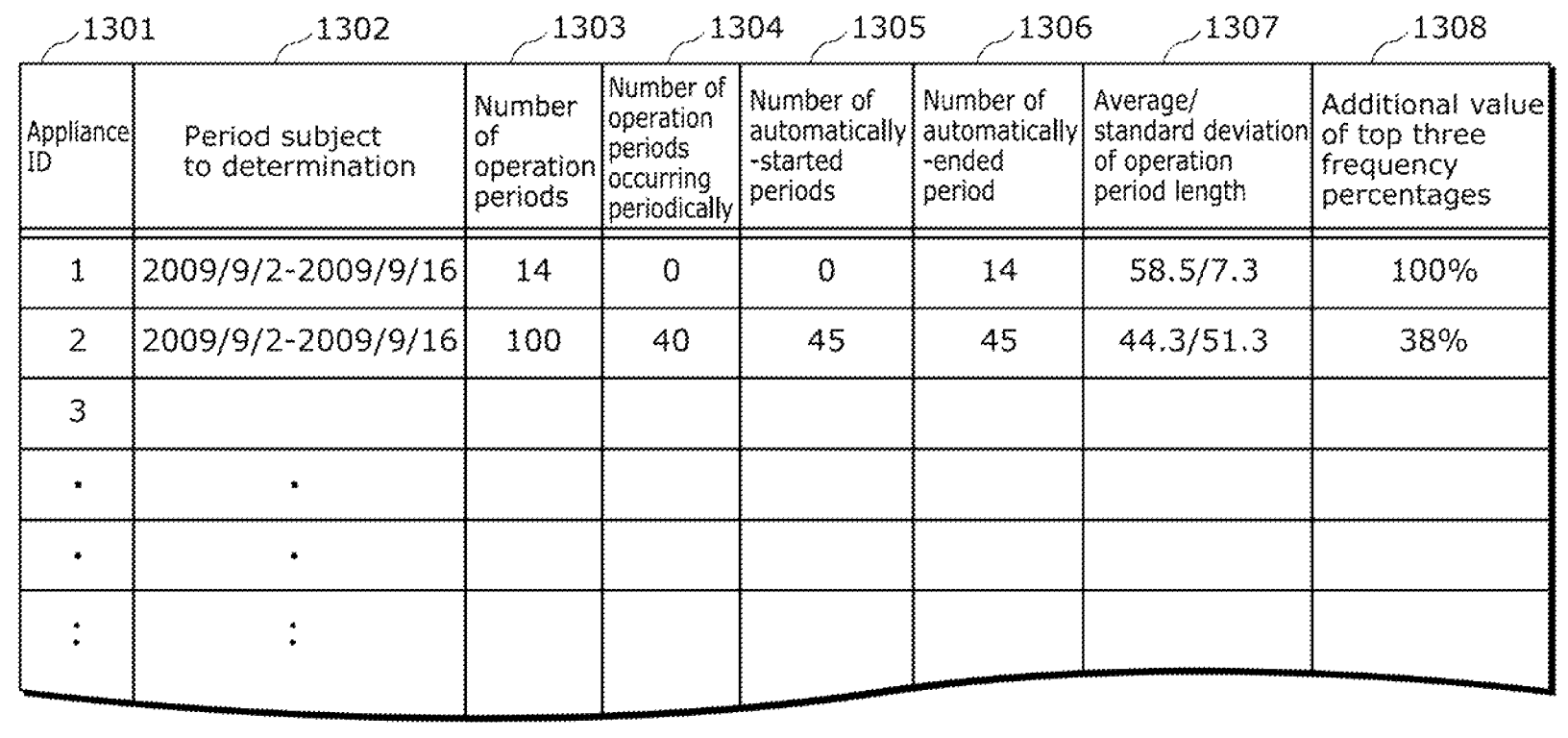

| Appliance ID (1301) | Period subject to determination (1302) | Number of operation periods (1303) | Number of operation periods occurring periodically (1304) | Number of automatically-started periods (1305) | Number of automatically-ended period (1306) | Average/standard deviation of operation period length (1307) | Additional value of top three frequency percentages (1308) |
|---|---|---|---|---|---|---|---|
| 1 | 2009/9/2-2009/9/16 | 14 | 0 | 0 | 14 | 58.5/7.3 | 100% |
| 2 | 2009/9/2-2009/9/16 | 100 | 40 | 45 | 45 | 44.3/51.3 | 38% |
| 3 | . | . | . | . | . | . | . |

FIG. 15

| Appliance name (1101) | Starting status (1102) | Ending status (1103) | Occurrence of low power consumption (1104) | Distribution of period lengths (1105) | Standard period length (1106) |
|---|---|---|---|---|---|
| TV | Manual | Manual | Not present | Wide | Not applicable |
| DVD recorder | Manual/ Automatic | Manual/ Automatic | Not present | Wide | Not applicable |
| Washing machine | Manual | Automatic | Present (in first half of period) | Narrow | 30-60 |
| ･ ･ ･ | ･ ･ ･ | ･ ･ ･ | ･ ･ ･ | ･ ･ ･ | ･ ･ ･ |

FIG. 17

| Time unit (minute) | Number of started periods | Number of ended periods |
|---|---|---|
| 0 | 57 | 0 |
| 1 | 5 | 0 |
| 2 | 6 | 0 |
| ⋮ | ⋮ | ⋮ |
| 59 | 8 | 57 |

FIG. 19
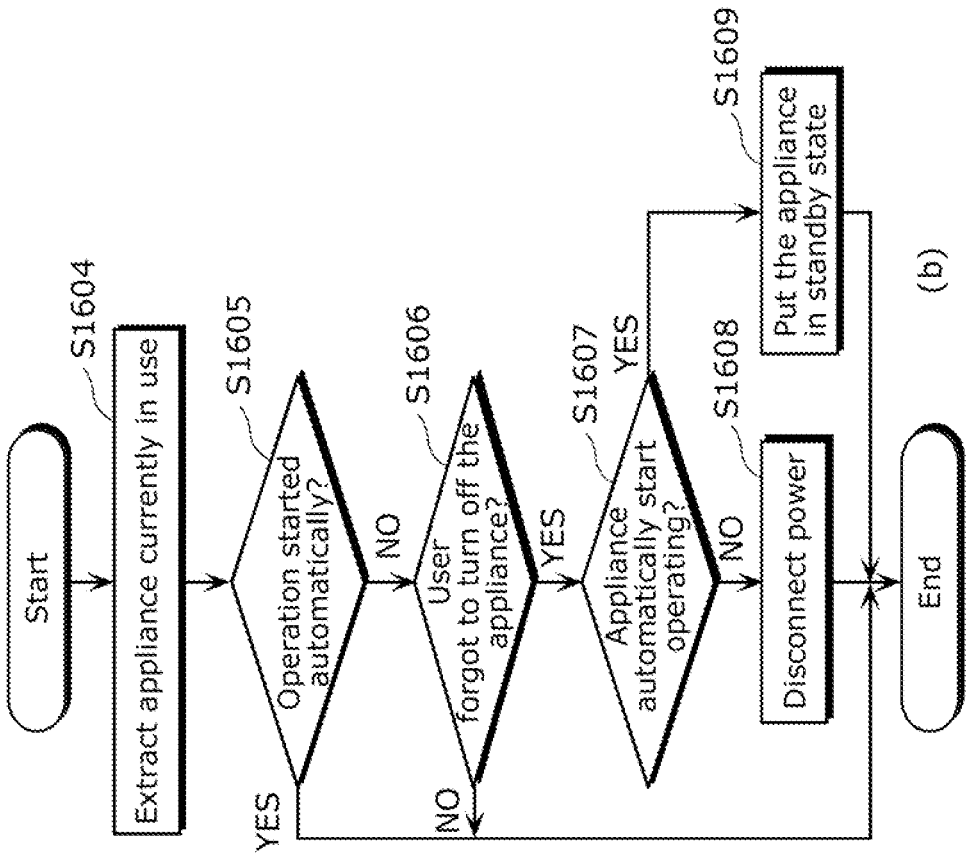
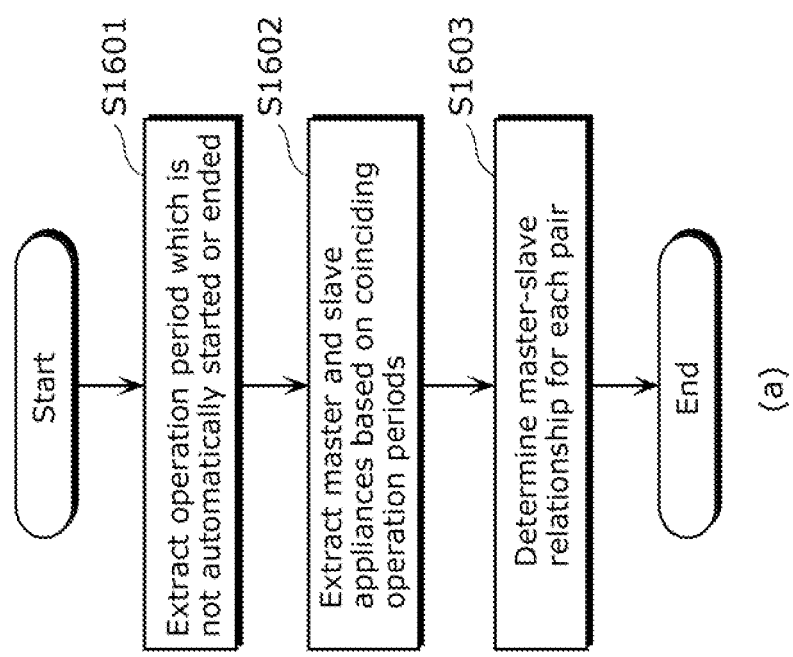

FIG. 20

| Master/slave pair No. ~1501 | Electrical appliance (master) ~1502 | Electrical appliance (slave) ~1503 |
|---|---|---|
| 1 | TV | Video recorder |
| 2 | TV | Game machine |
| 3 | Air conditioner | TV |
| . | . | . |
| . | . | . |
| : | : | : |

OPERATIONAL STATUS DETERMINATION DEVICE AND OPERATIONAL STATUS DETERMINATION METHOD

CROSS REFERENCE TO RELATED APPLICATION

This is a continuation application of PCT application No. PCT/JP2010/007190 filed on Dec. 10, 2010, designating the United States of America.

BACKGROUND OF THE INVENTION (1) Field of the Invention

The present invention relates to an operational status determination device and an operational status determination method which determine an operational status of an electrical appliance operating in a home environment. In particular, the present invention relates to an operational status determination device and an operational status determination method which determine whether the electrical device operates automatically by, for example, a timer function or is operated manually by a user.

(2) Description of the Related Art

In recent years, many electrical appliances, and more specifically, household electrical appliances, are used in a home, and a household power consumption is thus increasing. With this being the situation, a device has been proposed which supports energy saving to reduce electric power wasted by electrical appliances. For example, Japanese Unexamined Patent Application Publication No. 2001-152499 (referred to as Patent Reference 1 hereafter) discloses an automatic power-off device intended for home use. This device detects a standby power consumption of a household electrical appliance using a circuit for detecting a minute electric current, and then disconnects the power from a wall socket at a conclusion of a set elapsed time. Moreover, Japanese Unexamined Patent Application Publication No. 2003-348669 (referred to as Patent Reference 2 hereafter) discloses an electrical appliance which disconnects power supply when determining that a remote control is not in use and that the electrical appliance is in a standby state.

SUMMARY OF THE INVENTION

The conventional technologies disclosed by Patent References 1 and 2 determine a time period during which an electrical appliance is not used, by detecting the standby state of the electrical appliance. Then, the power supply to the electrical appliance is disconnected during the determined time period during which the electrical appliance is not used. This can reduce the standby power which is to be wasted. However, the stated conventional technologies cannot determine whether the electrical appliance starts operating automatically. Especially in the case of an electrical appliance typified by a video recorder that starts operating automatically, when the power supply is disconnected just because the electrical appliance is in the standby state, the electrical appliance cannot achieve the automatic operation. This means that a function desired by a user, such as a timer recording, cannot be performed. It should be noted here that, in the present specification, the automatic operation of an electrical appliance refers to the case where the electrical appliance operates automatically by itself, instead of the case where the electrical appliance is operated by an external electrical appliance.

The present invention is conceived in view of the aforementioned problem, and has an object to provide an operational status determination device and an operational status determination method capable of determining whether or not an electrical appliance operates automatically.

In order to achieve the above object, the present invention uses a characteristic of the automatic operation that, as typified by a TV program recording, a time of day set to record a TV program is periodic and, therefore, the time distribution is narrow. Moreover, the present invention uses a characteristic of the manual operation that, as typified by TV watching, the time distribution is wide. Based on these characteristics, it is determined whether or not the electrical appliance operates automatically.

The operational status determination device according to an aspect of the present invention includes: a receiving unit which receives data on power consumption of an appliance, the power consumption being measured at predetermined time intervals; a specification unit which specifies operation start times of the appliance, based on the power consumption data received by the receiving unit, the operation start times occurring in a certain period of time; and a determination unit which determines whether or not the appliance starts operating automatically, based on each of occurrence frequencies of the operation start times specified by the specification unit.

With this configuration, whether or not the appliance starts operating automatically is determined by reference to the frequencies of the operation start times. Thus, the electrical appliance which starts operating automatically can be specified with accuracy. This can in turn specify the electrical appliance whose standby power can be reduced by disconnecting the power, thereby achieving the energy saving of the electrical appliance.

It should be noted that the present invention can be implemented not only as an operational status determination device including the characteristic processing units as described above, but also as an operational status determination method having, as steps, the characteristic processing units included in the operational status determination device. Also, the present invention can be implemented as a computer program causing a computer to execute the characteristic steps included in the operational status determination method. It should be obvious that such a computer program can be distributed via a computer-readable recording medium such as a Compact Disc-Read Only Memory (CD-ROM) or via a communication network such as the Internet.

As described, the operational status determination device according to the present invention is capable of determining whether or not an electrical appliance operates automatically.

FURTHER INFORMATION ABOUT TECHNICAL BACKGROUND TO THIS APPLICATION

The disclosure of Japanese Patent Application No. 2010-021667 filed on Feb. 2, 2010 including specification, drawings and claims is incorporated herein by reference in its entirety.

The disclosure of PCT application No. PCT/JP2010/007190 filed on Dec. 10, 2010, including specification, drawings and claims is incorporated herein by reference in its entirety.

BRIEF DESCRIPTION OF THE DRAWINGS

These and other objects, advantages and features of the invention will become apparent from the following description thereof taken in conjunction with the accompanying drawings that illustrate a specific embodiment of the invention. In the Drawings:

FIG. 1 is a diagram showing an occurrence frequency distribution of operation start times of an appliance which starts operating automatically, and an occurrence frequency distribution of operation start times of an appliance which is started manually;

FIG. 6 is a diagram showing a specific example of power consumption data stored in a history storage unit;

FIG. 7A is a graph showing specific power consumption data of an electrical appliance;

FIG. 9A is a diagram showing a specific example of operation period information stored in an operation information storage unit;

FIG. 11 is a diagram showing a specific example of time-specific frequency information stored in the operation information storage unit;

FIG. 13 is a diagram showing a specific example of appliance information stored in an appliance information storage unit;

FIG. 15 is a diagram showing a specific example of appliance information stored in an appliance information storage unit;

FIG. 17 is a diagram showing a specific example of minute-specific frequency information stored in an operation information storage unit in a first modification of the present embodiment according to the present invention;

FIG. 19 is a flowchart showing energy-saving support processing in a third modification of the present embodiment according to the present invention;

FIG. 20 is a diagram showing a specific example of data obtained as a result of determining master and slave appliances.

DESCRIPTION OF THE PREFERRED EMBODIMENT

In the case where an automatic operation is executed by an electrical appliance, typified by a video recorder which records a TV program, according to an operation start time or an operation end time set by a user (these times may be simply referred to as the start time and the end time, respectively, hereafter), the same start or end time is set regularly. In other words, the start or end time is periodic in many cases. For this reason, each occurrence frequency distribution of the start and end times is likely to be narrow. Hereafter, the occurrence frequency is simply referred to as the frequency. An electrical appliance, such as a washing machine or an electric rice cooker, is started manually and usually ends automatically. Such an electrical appliance ends automatically always after executing the same task, meaning that the frequency distribution of operation period lengths is likely to be narrow. On the other hand, an electrical appliance, such as a TV, is started manually and ended manually. In the case of such an electrical appliance, each frequency distribution of the operation start and end times and the frequency distribution of the operation period lengths are wide. Based on these characteristics, it is determined whether an operation of an electrical appliance is performed automatically or manually, in the present embodiment.

For example, (a) in FIG. 1 shows a graph of a frequency distribution of operation start times of a video recorder which starts a timer recording at 7:00 every day. As shown, the frequency distribution in (a) of FIG. 1 is narrow. On the other hand, (b) in FIG. 1 shows a graph of a frequency distribution of operation start times of a TV which is manually turned ON at around 7:00 every day. As shown, the frequency distribution in (b) of FIG. 1 is wide to some extent.

It should be noted that, in the present embodiment, an operational status of an electrical appliance is determined on the basis of a distribution manner of frequencies of the operation start or end times or the operation period lengths. On this account, the present embodiment is described on the assumption that a certain level of frequencies can be ensured for the operation start and end times and for the operation period lengths.

The following is a description of the embodiment according to the present invention, with reference to the drawings.

Figure 2:
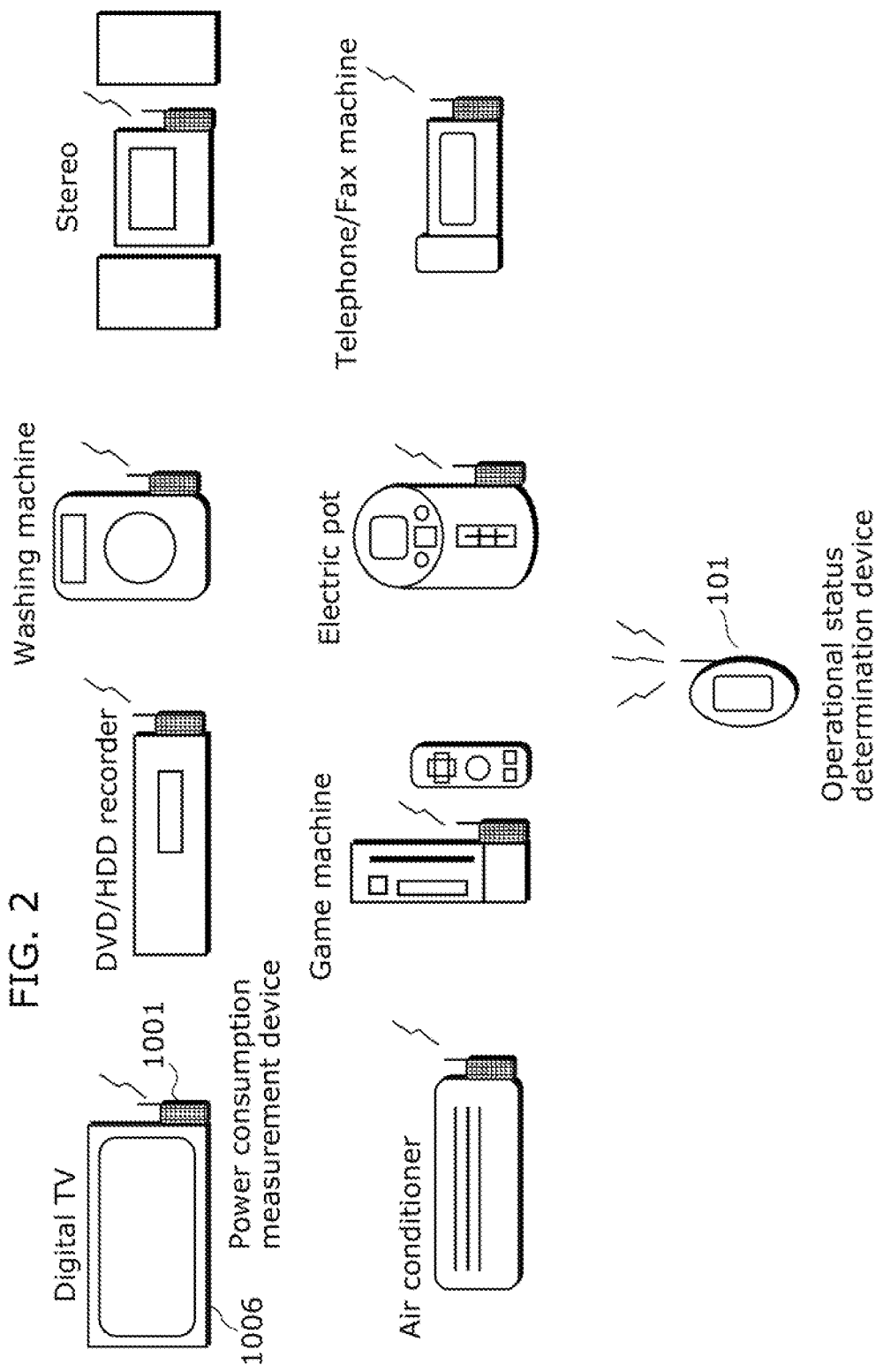
FIG. 2 is a diagram showing a schematic configuration of an energy-saving support system in an embodiment according to the present invention.

FIG. 2 is a diagram showing a schematic configuration of an energy-saving support system in the present embodiment. The energy-saving support system includes at least one electrical appliance 1006 installed in a home, a power consumption measurement device 1001 installed for each of the electrical appliances 1006, and an operational status determination device 101. Here, examples of the electrical appliance 1006 include a digital TV and a washing machine. Hereafter, the electrical appliance 1006 may be simply referred to as the "appliance" when deemed appropriate.

The power consumption measurement device 1001 measures a power consumption of the electrical appliance 1006 in chronological order and sends the result as time series data to the operational status determination device 101. Moreover, the power consumption measurement device 1001 controls ON/OFF of the electrical appliance 1006.

The operational status determination device 101 collects, from the power consumption measurement device 1001, the time series data on the power consumption of at least one electrical appliance 1006. Based on the collected time series data on the power consumption, the operational status determination device 101 determines whether or not the electrical appliance 1006 automatically starts or ends operating. Then, according to the result of the determination, the operational status determination device 101 performs energy-saving support. The present embodiment describes a method of determining whether or not the electrical appliance 1006 automatically starts or ends operating. Moreover, the present embodiment describes a method of performing, based on the result of the above determination, energy-saving support on the electrical appliance 1006 by reducing the standby power consumption of the electrical appliance 1006 and reducing the number of states where the electrical appliance 1006 stays ON because the user forgot to turn OFF the electrical appliance 1006.

Figure 3:
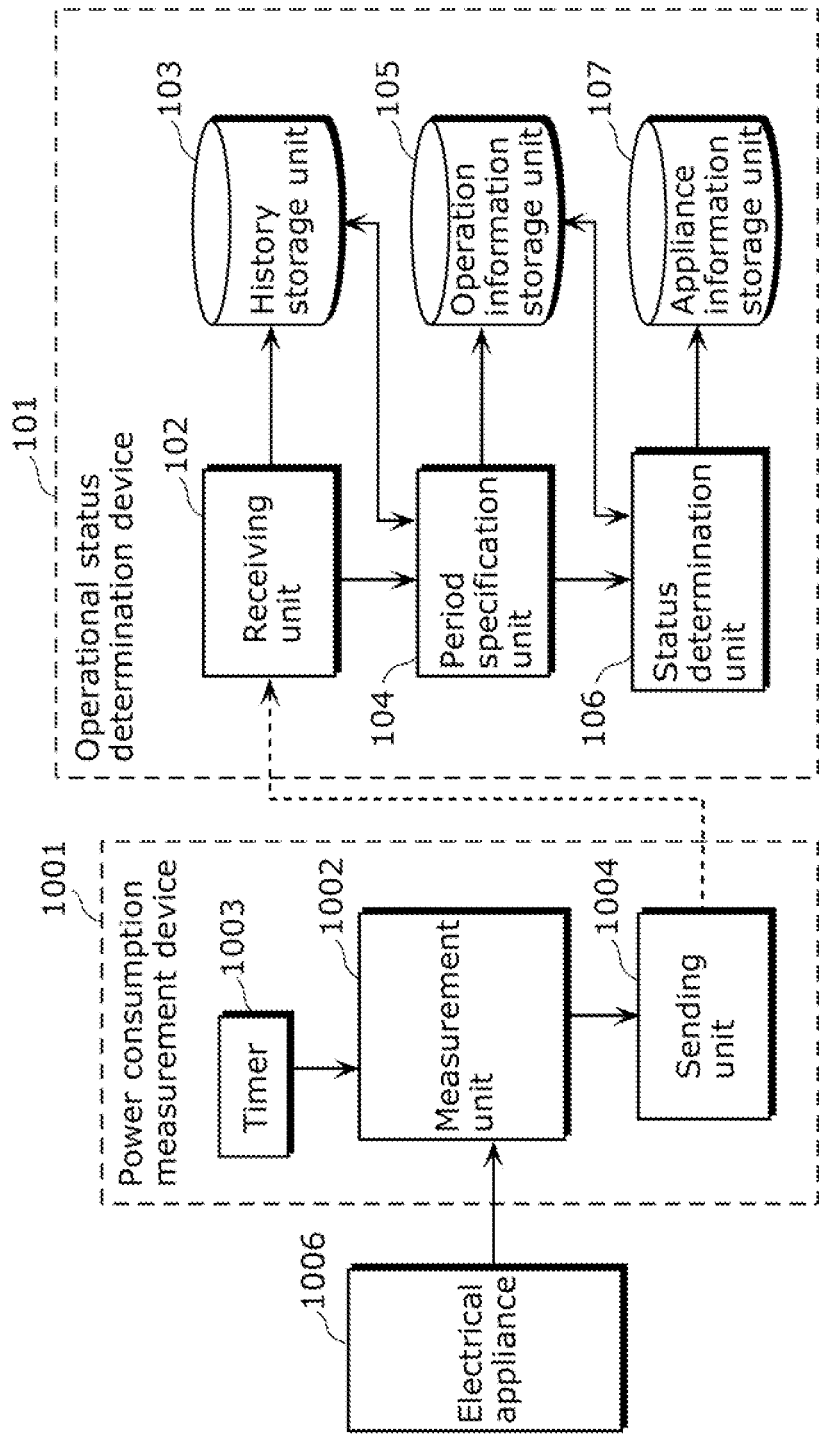
FIG. 3 is a block diagram showing each functional configuration of a power consumption measurement device and an operational status determination device both included in the energy-saving support system in the present embodiment according to the present invention.

FIG. 3 is a block diagram showing each functional configuration of the power consumption measurement device 1001 and the operational status determination device 101 both included in the energy-saving support system.

The power consumption measurement device 1001 includes a measurement unit 1002, a timer 1003, and a sending unit 1004. The power consumption measurement device 1001 is connected between a power source and the electrical appliance 1006.

The timer 1003 indicates a current time.

The measurement unit 1002 is connected to the corresponding target electrical appliance 1006, and measures the power consumption of the electrical appliance 1006. The power consumption is calculated by, for example, multiplying a value of voltage applied to the electrical appliance 1006 by a value of current passing through the electrical appliance 1006. The measurement unit 1002 sends, to the sending unit 1004, the value of the measured power consumption together with a measurement date and time obtained by the timer 1003. It should be noted that the power consumption is measured at predetermined time intervals and that the timer 1003 is also used for measuring this time interval.

The sending unit 1004 sends, to the operational status determination device 101, the data including: the value of the measured power consumption of the target electrical appliance 1006; and the measurement date and time. Hereafter, this data is simply referred to as the "power consumption data". Note that the data may be transmitted via a wired or wireless connection.

The operational status determination device 101 includes a receiving unit 102, a history storage unit 103, a period specification unit 104, an operation information storage unit 105, a status determination unit 106, and an appliance information storage unit 107.

The receiving unit 102 receives, from the power consumption measurement device 1001 installed in the electrical appliance 1006, the power consumption data of the present electrical appliance 1006 measured at the predetermined intervals. Then, the receiving unit 102 stores the received power consumption data into the history storage unit 103.

Based on the power consumption data of the electrical appliance 1006 stored in the history storage unit 103, the period specification unit 104 specifies an operation period during which the present electrical appliance 1006 is operating. Then, the period specification unit 104 stores various kinds of information on the operation period into the operation information storage unit 105. When the appliance is operating, this means that the appliance is ON and that the appliance consumes a predetermined amount of power or more in a predetermined period of time. On the other hand, when the appliance is not operating, this means that the appliance is OFF or that the appliance is ON but consumes less than the predetermined amount of power in the predetermined period of time. For example, in the case of an appliance such as a DVD player, when the DVD player is operating, this means that the DVD player is ON and the user is using the DVD player to play back video. As another example where the DVD player is operating, the DVD player is ON and is not currently being used but readily available, such as when the DVD player is ON and video is not currently being played back. On the other hand, examples where the appliance is not operating include the case where the appliance is OFF, and the case where the appliance is in the standby state such as when the appliance is ON but consumes less than the predetermined amount of power, that is, consumes only standby power, in the predetermined period of time.

The status determination unit 106 determines whether the operation performed in the operation period of the electrical appliance 1006 stored in the operation information storage unit 105 is automatically started and ended. The status determination unit 106 stores the result of the determination into the operation information storage unit 105 as new information on the operation period, and also stores this result into the appliance information storage unit 107 as information on the electrical appliance 1006.

Figure 4:
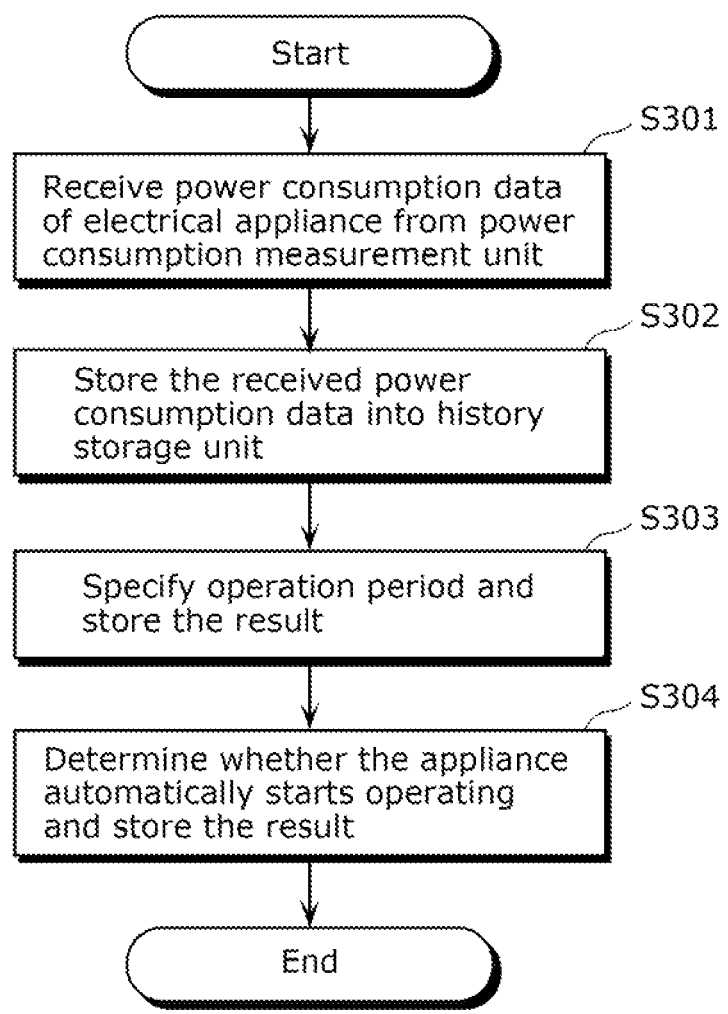
FIG. 4 is a flowchart showing processing performed by the operational status determination device.

FIG. 4 is a flowchart showing processing performed by the operational status determination device 101. The operational status determination device 101 determines whether or not the target electrical appliance 1006 automatically starts or ends operating. In the following, a video recorder is used as a specific example of the electrical appliance 1006 to explain the processing.

Figure 5:
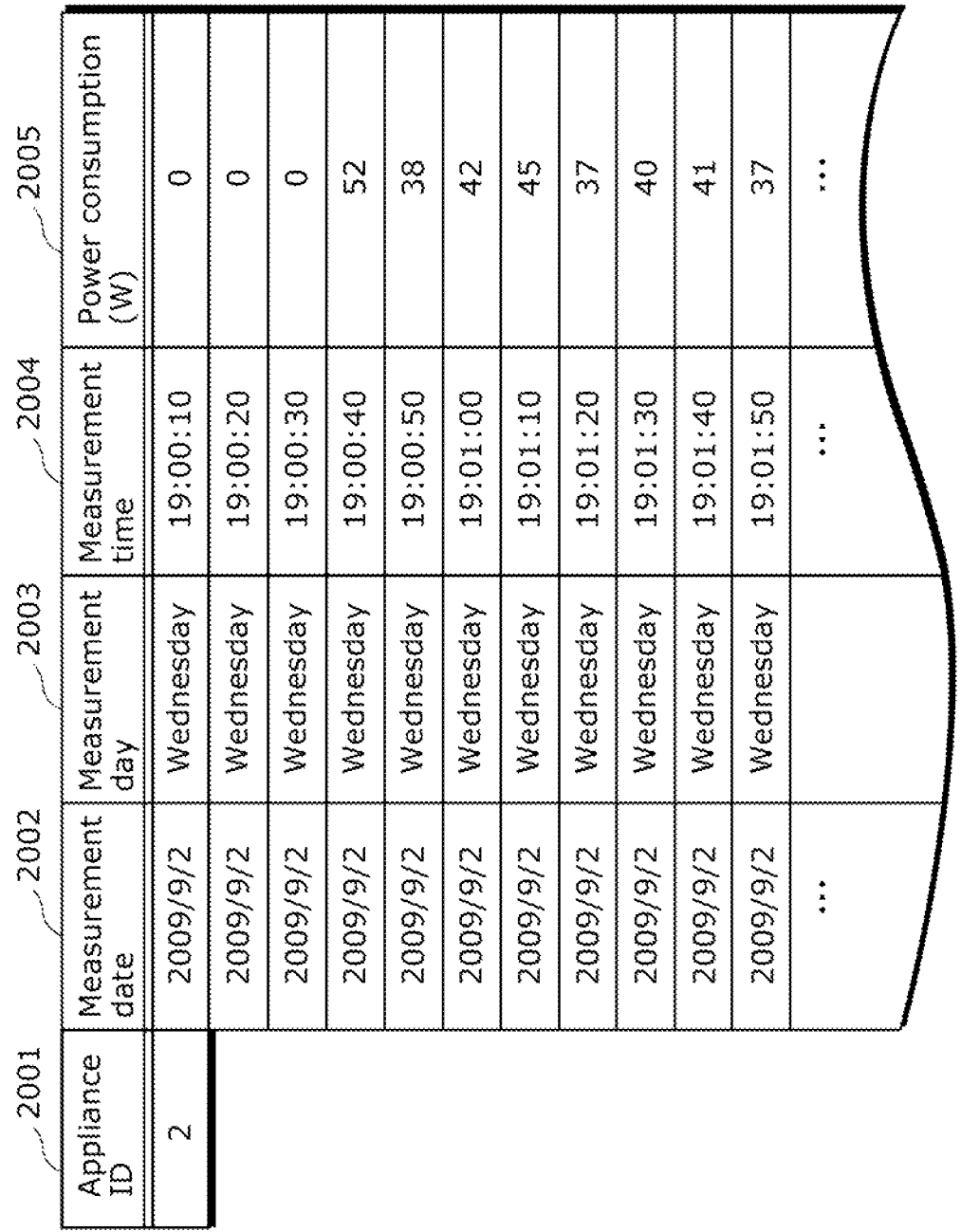
FIG. 5 is a diagram showing an example of power consumption data obtained as a result of measurement performed at intervals of 10 seconds by the power consumption measurement device installed in a video recorder.

The receiving unit 102 receives, from the power consumption measurement device 1001 installed in the electrical appliance 1006, the power consumption data of the present electrical appliance 1006 that includes the measurement date and time and the value of the measured power consumption (S301). FIG. 5 shows an example of the power consumption data obtained as a result of measurement performed at intervals of 10 seconds by the power consumption measurement device 1001 installed in the video recorder. An item 2001 indicates an appliance ID of the video recorder, an item 2002 indicates a measurement date, an item 2003 indicates a measurement day of the week, and an item 2004 indicates a measurement time of day. An item 2005 indicates the power consumption of the video recorder measured at a date and time specified in the items 2002 to 2004.

The receiving unit 102 stores the received power consumption data of the electrical appliance 1006 into the history storage unit 103 (S302). FIG. 6 shows a specific example of the power consumption data stored in the history storage unit 103. The power consumption data includes the measurement date and time and the value of the measured power consumption for each of the electrical appliances 1006. More specifically, an item 401 indicates a measurement date, an item 402 indicates a measurement day of the week, and an item 403 indicates a measurement time of day. Each of an item 404 and subsequent items indicates the measured power consumption of the corresponding electrical appliances 1006. Note that each of the electrical appliances 1006 is identified by the appliance ID. The items 404 and 405 indicate the power consumptions of the electrical appliances 1006 with the appliance IDs of "1" and "2", respectively; which are measured at the measurement time indicated in the item 403. Suppose that the electrical appliance 1006 with the appliance ID "1" is a washing machine and that the electrical appliance 1006 with the appliance ID "2" is the video recorder. FIG. 6 shows that, at the measurement time "19:00:10", the power consumptions of the washing machine and the video recorder are 125 W and 0 W, respectively. FIG. 6 shows only the item 403 as the item indicating the measurement time, on the assumption that the power consumptions of all the electrical appliances 1006 are measured at the same time of day. However, in the case where the power consumptions of the plurality of electrical appliances 1006 are measured at different times of day, the history storage unit 103 may store the power consumption data in which the measured power consumption and the measurement time are associated for each of the electrical appliances 1006.

It should be noted that the processing of receiving the power consumption data (S301) and the processing of storing the power consumption data (S302) are performed at all times and that the following steps S303 and S304 are executed as necessary. In these steps, the operational status is determined and the result of the determination is stored.

The period specification unit 104 specifies an operation period during which the electrical appliance 1006 is operating, from the power consumption data of the electrical appliance 1006 which is obtained as a result of the measurement performed for a certain period of time and is stored in the history storage unit 103 (S303). In the present embodiment, the operational status is determined on the basis of the frequency distributions of the operation start and end times of the electrical appliance 1006. In order to specify the operation start and end times, the operation period of the electrical appliance 1006 needs to be specified first.

Figure 7B:
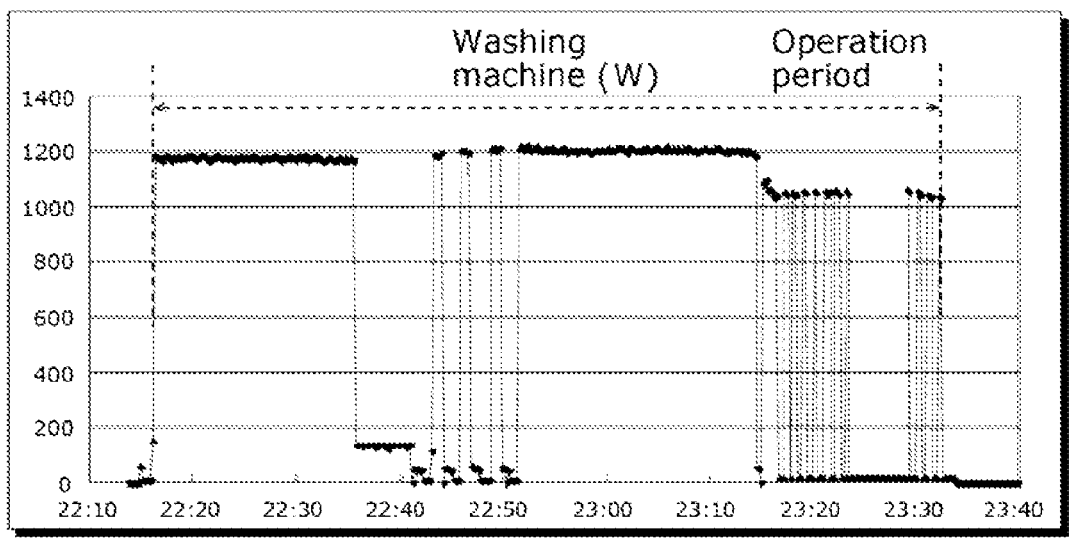
FIG. 7B is a graph showing specific power consumption data of an electrical appliance.
Figure 7C:
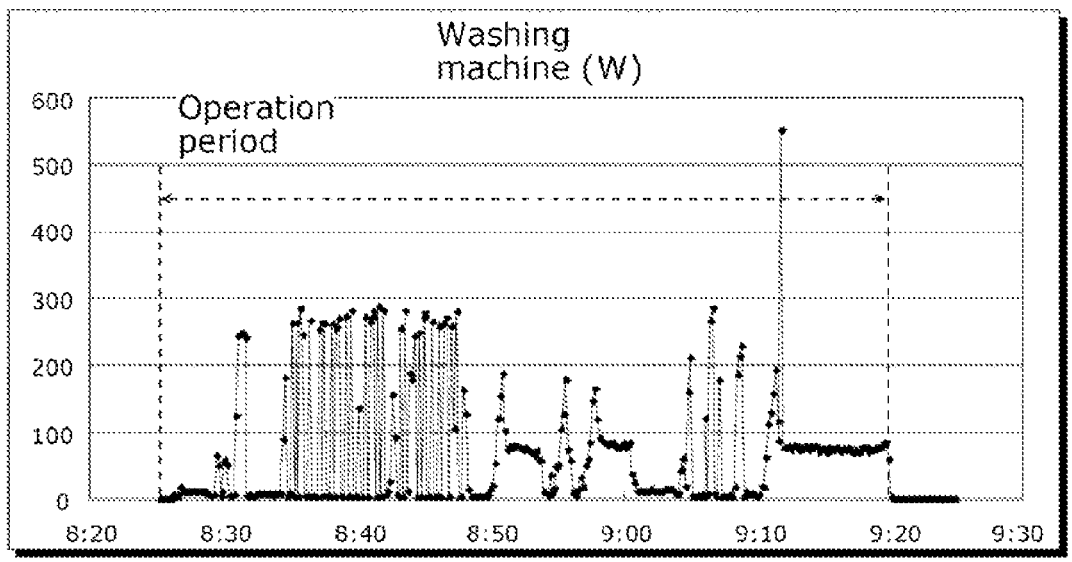
FIG. 7C is a graph showing specific power consumption data of an electrical appliance.
Figure 8:
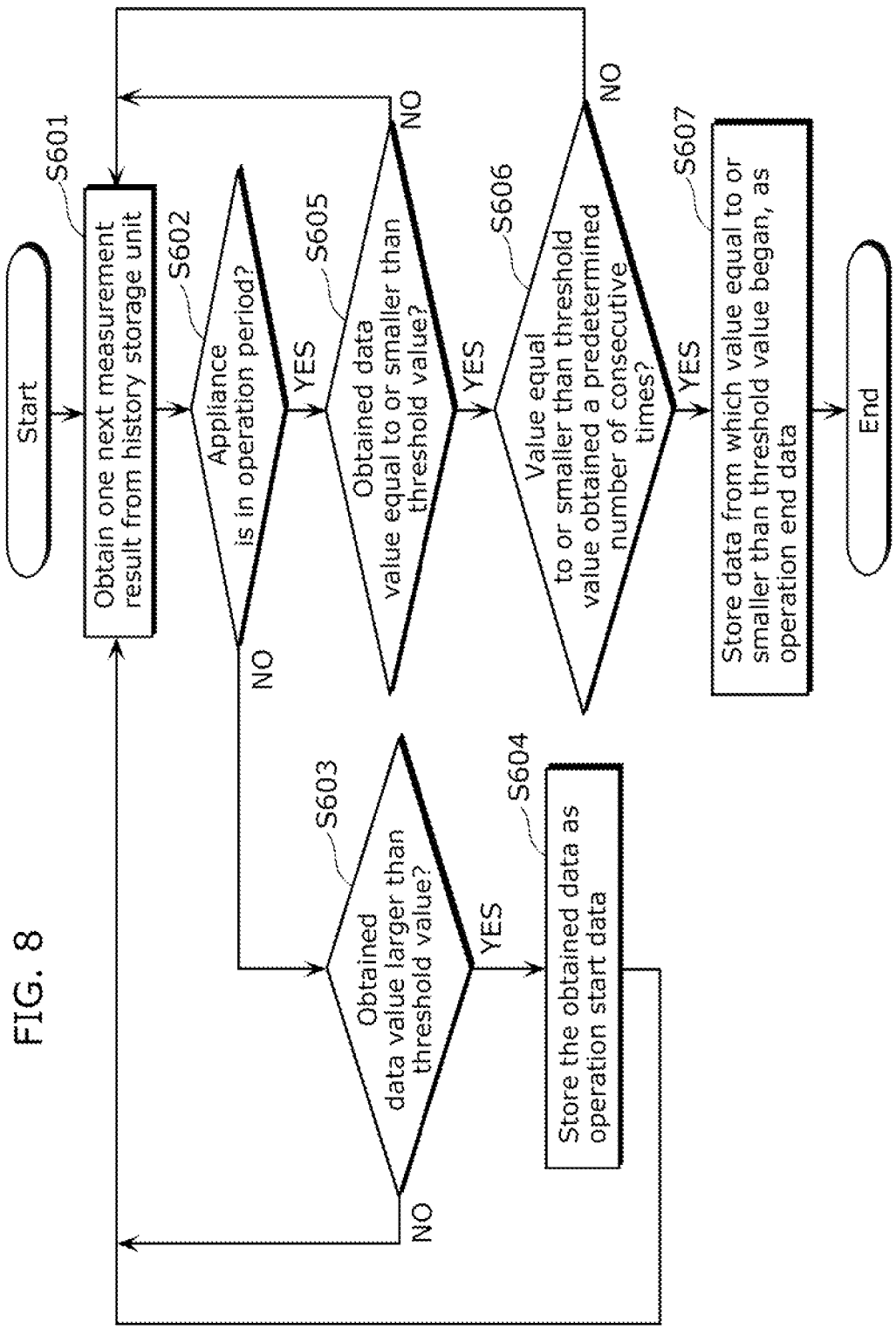
FIG. 8 is a flowchart showing period specification processing performed by a period specification unit.

Each of FIGS. 7A to 7C is a graph showing specific power consumption data of the electrical appliance 1006, and shows the operation period specified by the period specification unit 104. In the case of the video recorder, such as a DVD recorder, shown in FIG. 7A, variations in the power consumption are small among the operation periods for playing back a DVD, which is the main function of the DVD recorder, and for recording and viewing TV programs. The state where such an appliance is operating refers to the state where the appliance is consuming the predetermined amount of power or more at a certain time of day, i.e., the measurement timing. On the other hand, in each case of a dishwasher shown in FIG. 7B and a washing machine shown in FIG. 7C, variations in the power consumption are large during an operation period from a start of a function desired by the user (such as a washing function) to an end of the function. On this account, it is difficult to specify the operation period of such an appliance only from whether or not the appliance is consuming the predetermined amount of power or more. Thus, in order to specify the operation period from the power consumption data of such an appliance, the period specification unit 104 performs processing shown by a flowchart in FIG. 8. This processing may be referred to as the period specification processing hereafter.

Firstly, the period specification unit 104 obtains the value of the measured power consumption at a certain time of day from the power consumption data of the electrical appliance 1006 that is stored in the history storage unit 103 (S601). For example, as the value of the power consumption of the video recorder with the appliance ID "2" that is measured at the certain time of day, the period specification unit 104 obtains, from the power consumption data shown in FIG. 6, the value "0" which is measured at 19:00:30 on Sep. 2, 2009. Here, the period specification unit 104 is capable of remembering the data which has been so far obtained for determining the operation period. Therefore, for obtaining the value of the measured power consumption, the period specification unit 104 obtains a next piece of data in chronological order, that is, the data subsequent to the already-obtained data. In other words, the period specification unit 104 obtains the latest, yet-to-be-obtained data.

The period specification unit 104 holds information indicating whether or not the electrical appliance 1006 which is the current target for the period specification processing is currently in the operation period. At the time of obtaining the value of the measured power consumption, the period specification unit 104 determines, based on the held information, whether or not the electrical appliance 1006 is currently in the operation period (S602). When the electrical appliance 1006 is not in the operation period (NO in S602), the period specification unit 104 determines whether or not the obtained data indicates a value larger than a threshold value (S603). When the obtained data indicates the value larger than the threshold value (YES in S603), the period specification unit 104 stores this data, as operation start data, into the operation information storage unit 105 (S604). When the obtained data indicates a value equal to or smaller than the threshold value (NO in S603), the period specification unit 104 obtains a next value of the measured power consumption (S601). For example, as the next value of the measured power consumption of the video recorder with the appliance ID "2", the period specification unit 104 obtains, from the power consumption data shown in FIG. 6, the value "52" which is measured at 19:00:40 on Sep. 2, 2009.

When the value of the measured power consumption is obtained (S601) and, this time, the electrical appliance 1006 is determined as currently being in the operation period from the held information (YES in S602), the period specification unit 104 determines whether the obtained data indicates a value equal to or smaller than the threshold value (S605). When the obtained data indicates the value larger than the threshold value (NO in S605), the period specification unit 104 holds information indicating that the operation period is continuing and then obtains a next value of the measured power consumption (S601). When the obtained data indicates the value equal to or smaller than the threshold value (YES in S605), the period specification unit 104 determines whether or not such a value, i.e., the value equal to or smaller than the threshold value, has been obtained a predetermined number of consecutive times or more (S606). When such a value has not been obtained the predetermined number of consecutive times or more (NO in S606), the period specification unit 104 obtains a next value of the measured power consumption (S601). When determining that such a value has been obtained the predetermined number of consecutive times or more (YES in S606), the period specification unit 104 stores the earlier data from which such a value began, as operation end data, into the operation information storage unit 105 (S607). When detecting the operation end data, the period specification unit 104 holds information, as the held information, which indicates that the electrical appliance 1006 is not in the operation period. The period specification unit 104 specifies, as an operation period, a period from the measurement time of the operation start data to the measurement time of the operation end data. Then, the period specification unit 104 stores various kinds of information for each operation period into the operation information storage unit 105, and then terminates the period specification processing (S303 in FIG. 4).

Figure 9B:
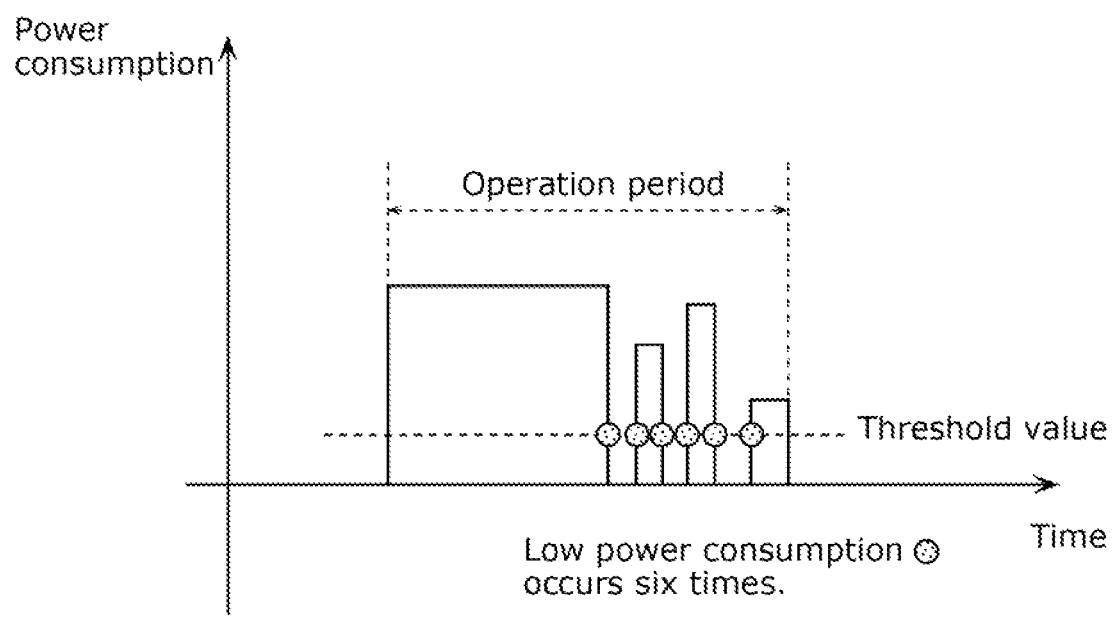
FIG. 9B is a diagram showing an example of an operation period where low power consumption occurs six times.

FIG. 9A shows an example of operation period information stored by the period specification unit 104 into the operation information storage unit 105. To be more specific, an item 701 indicates the operation period information of the electrical appliance 1006 with the appliance ID "1" and includes items 702 to 709. The item 702 indicates a period number identifying the operation period, and the items following the item 702 indicate data on the operation period whose number is specified in the item 702. More specifically, the items 703 and 704 indicate an operation date and an operation day of the week, respectively. The items 705 and 706 indicate operation start and end times, respectively. The item 707 indicates an operation period length, the item 708 indicates the measured power consumption, and the item 709 indicates the number of times that low power consumption occurs. The number indicated in the item 709 refers to the number of times that the value of the measured power consumption crosses a predetermined threshold value during the corresponding operation period. For example, although the number is "0" in each of the operation periods of the DVD recorder shown in FIG. 7A, there are many times that the power consumption value crosses the predetermined threshold value during each of the operation periods of the dishwasher shown in FIG. 7B and the washing machine shown in FIG. 7C. FIG. 9B shows an example of an operation period where the low power consumption occurs six times. An item 710 in FIG. 9A indicates operational statuses at the start and end of the operation and, more specifically, indicates whether the electrical appliance 1006 automatically or manually started the operation and whether the electrical appliance 1006 automatically or manually ended the operation. To be more specific, the result of the determination made by the status determination unit 106 is written into the item 710. The processing performed by the status determination unit 106 is described later.

It should be noted that the period specification processing may be performed in real time. More specifically, whenever the receiving unit 102 stores the measured power consumption of the electrical appliance 1006 into the history storage unit 103, the period specification unit 104 obtains this measured power consumption and performs the processing shown by the flowchart of FIG. 8. Then, the period specification unit 104 stores the current status of the electrical appliance 1006 into the operation information storage unit 105. For example, when determining that the currently-obtained data is the operation start data (S604) and that the operation is not finished yet (NO in S605), the period specification unit 104 stores the information indicated in the items 702 to 705 of FIG. 9A into the operation information storage unit 105.

Referring back to FIG. 4, the processing performed by the operational status determination device 101 is described.

The status determination unit 106 determines whether the electrical appliance 1006 automatically starts and ends operating, by reference to the stored period information of two or more days included in the aforementioned certain period of time (S304). The status determination unit 106 then stores the result of the determination into the operation information storage unit 105 and the appliance information storage unit 107 (S304). Specific processes are described as follows.

Figure 10:
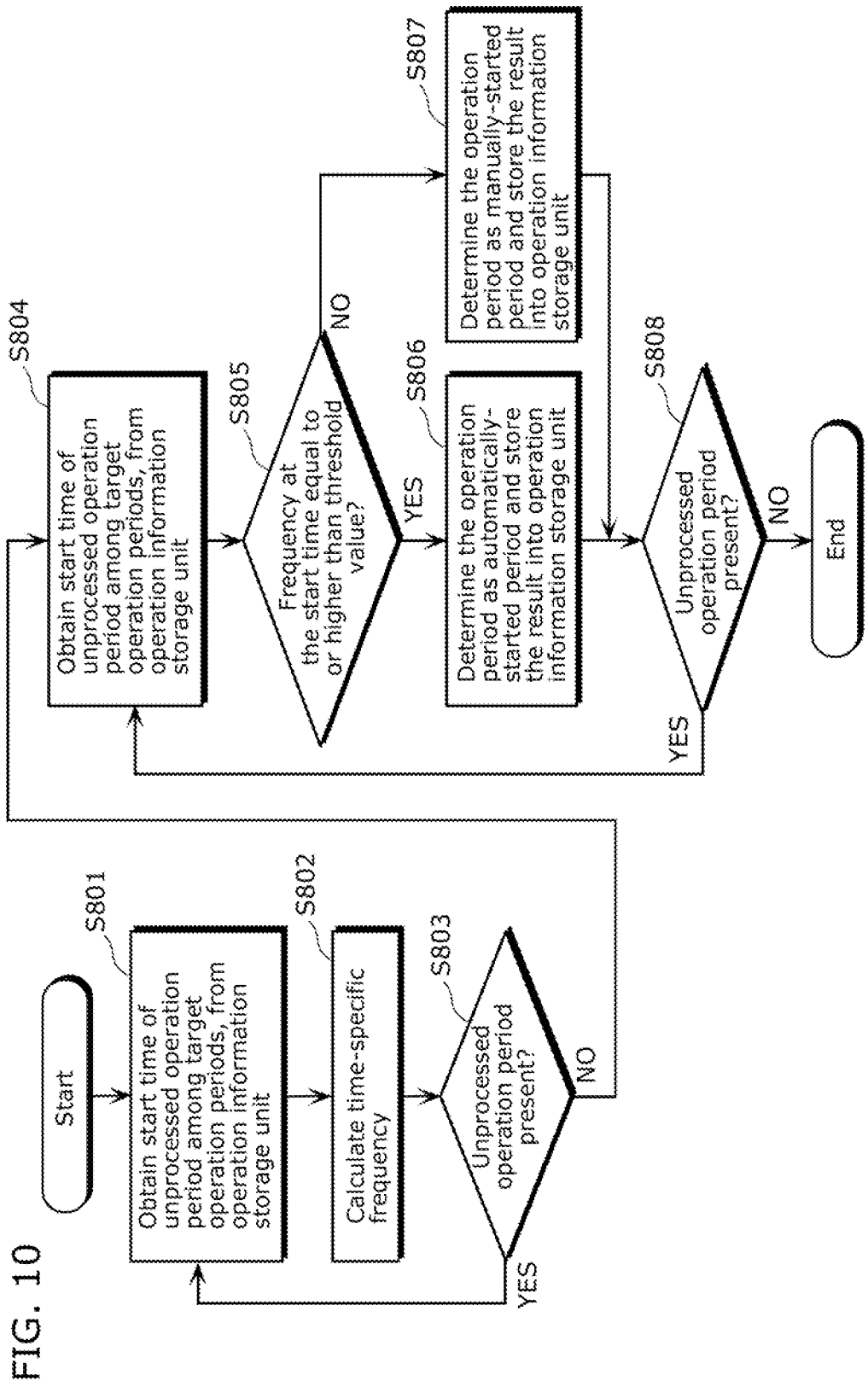
FIG. 10 is a flowchart showing processing performed by a status determination unit.

Firstly, processing of determining whether or not the electrical appliance 1006 starts operating automatically is explained, with reference to a flowchart shown in FIG. 10. This processing is referred to as the automatic-start determination processing. The automatic-start determination processing basically includes two processes. A first process is to calculate a frequency for each of the operation start times included in a plurality of target operation periods (S801 to S803). This frequency is referred to as the time-specific frequency. A second process is to determine whether the target operation periods are started automatically or manually, using the time-specific frequencies of the operation start times obtained in the first process (S804 to S808).

Firstly, the first process of calculating a time-specific frequency for each of the operation start times included in the target operation periods is described. The status determination unit 106 extracts, from the target operation periods stored in the operation information storage unit 105, an operation period which has yet to be used for calculating the time-specific frequencies, and then obtains an operation start time of the extracted operation period (S801). Following this, the status determination unit 106 updates time-specific frequency information, using the obtained operation start time of the extracted operation period (S802). Here, the time-specific frequency information indicates the total number of started operation periods and the total number of ended operation periods which are counted at predetermined time intervals, and is stored in the operation information storage unit 105. FIG. 11 shows an example of the time-specific frequency information. An item 901 indicates a time of day whose occurrence frequency is calculated. When a time interval between the times indicated in the item 901 (i.e., one minute in FIG. 11) is identical to a time interval between the power consumption measurements performed by the measurement unit 1002, the frequency distribution is calculated using the measurement times of the measurement unit 1002 as they are. On the other hand, when the time interval between the times indicated in the item 901 is different from the time interval between the measurements by the measurement unit 1002, the present time interval of the measurement unit 1002 needs to be made correspond to the time interval of the item 901. For example, suppose that the measurement unit 1002 outputs the measurement result at intervals of one second and that the time interval between the times indicated in the item 901 is one minute. In this case, "7:00" in minutes corresponds to "6:59:30 to 7:00:29" in seconds. An item 902 indicates the total number of operation periods which start at the time indicated in the item 901, and an item 903 indicates the total number of operation periods which end at the time indicated in the item 901. The status determination unit 106 determines whether or not there is an operation period which has yet to be used for calculating the time-specific frequencies (S803). When such an operation period is present (YES in S803), the status determination unit 106 performs the above processes (S801 and S802). When such an operation period is not present (NO in S803), the status determination unit 106 proceeds to the process of determining whether or not the target operation periods are started automatically.

Next, the following describes the second process of determining whether or not the target operation periods are started automatically, by using the time-specific frequencies of the operation start times obtained in the first process. The status determination unit 106 extracts, from the target operation periods stored in the operation information storage unit 105, an operation period for which the automatic-start determination processing has yet to be performed, and then obtains an operation start time of the extracted operation period (S804). Following this, the status determination unit 106 obtains, from the time-specific frequency information stored in the operation information storage unit 105, the time-specific frequency of the operation start time of the extracted operation period, and determines whether or not the present frequency is equal to or larger than a threshold value (S805). When the frequency is equal to or higher than the threshold value (YES in S805), the status determination unit 106 determines that the present operation period starts automatically (S806). When the frequency is lower than the threshold value (NO in S805), the status determination unit 106 determines that the present operation period is started manually instead of automatically (S807). The result of this determination is stored into the operation information storage unit 105 as shown in the item 710 of FIG. 9A, for example. The status determination unit 106 determines whether or not there is an operation period for which the automatic-start determination processing has yet to be performed (S808). When such an operation period is present (YES in S808), the status determination unit 106 performs the above processes (S804 and S807). When such an operation period is not present (NO in S808), the status determination unit 106 terminates the processing.

It should be noted that, in the automatic-start determination processing, periodicity exhibited by a date or a day of the week may be used in addition to the time-specific frequency. For example, the status determination unit 106 determines whether 28 operation periods starting at 7:00 as in FIG. 11 include operation periods exhibiting periodicity. To be more specific, the status determination unit 106 uses a rule stored beforehand for determining periodicity based on a day of the week or a time interval between the operation periods. For example, the status determination unit 106 uses the rule, such as whether the operation periods occur on the same day of the week or whether the operation periods occur on consecutive days. When such operation periods are present, the status determination unit 106 determines that these operation periods are periodic and start automatically. By using periodicity in this way, the operation periods counted in the same time-specific frequency can be further classified into "automatic" and "manual" with more accuracy.

Figure 12:
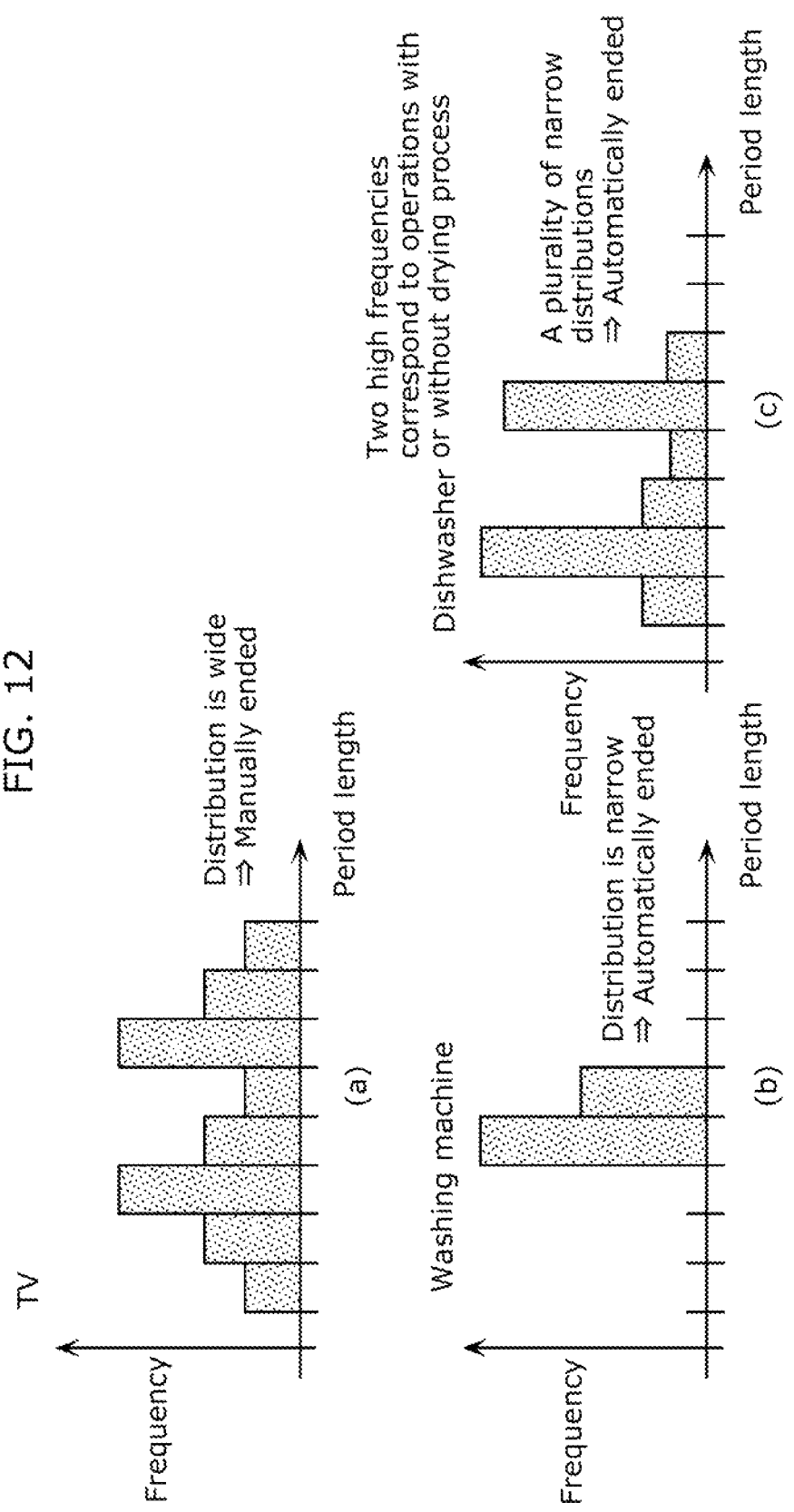
FIG. 12 is a diagram showing examples of occurrence frequency distributions of operation period lengths.

The status determination unit 106 determines whether or not the operation of the electrical appliance 1006 ends automatically, according to the same method as used in the automatic-start determination processing. Hereafter, this processing is referred to as the automatic-end determination processing. To be more specific, the status determination unit 106 calculates a time-specific frequency for each of the operation end times included in the operation periods. Then, when the number of operation periods ending at the same time is equal to or larger than a predetermined number, the status determination unit 106 determines that these operation periods end automatically. When the electrical appliance 1006 is the video recorder which ends operating at the set time, the automatic-end determination can be made by the method employing the time-specific frequency. However, when the electrical appliance 1006 is, for example, a microwave oven, a washing machine, or a dishwasher which, in general, is started manually and ends automatically, the automatic-end determination processing cannot be correctly performed by the aforementioned method. Thus, the automatic-end determination processing is performed using a frequency distribution of operation period lengths, instead of using the time-specific frequencies of the operation end times. More specifically, the status determination unit 106 calculates the frequency distribution of the operation period lengths. Then, when the operation period has the operation period length which occurs with a frequency higher than a threshold value, the status determination unit 106 determines that this operation period ends automatically. FIG. 12 shows examples of frequency distributions of operation period lengths. In each graph, the horizontal axis represents the operation period length and the vertical axis represents the frequency. When the operation start time varies as in the case of the TV, the frequency distribution of the operation period lengths is wide as shown in (a) of FIG. 12. On the other hand, when the operation ends automatically after the execution of a certain function as in the case of the washing machine, the frequency distribution of the operation period lengths is narrow as shown in (b) of FIG. 12. Moreover, since the dishwasher, for example, has a washing function and a drying function, there may be the cases where only the washing function is executed and where the washing and drying functions are sequentially executed. This means that the number of executed functions may be different each time. In the case of such an appliance, the frequency distribution of the operation period lengths is as shown in (c) of FIG. 12, where a plurality of narrow distributions occur. Even in this case, the automatic-end determination processing can be performed using the distribution width.

Note that each of the frequency threshold values used in the above automatic-start and -end determination processing may be a fixed value. Alternatively, the threshold value may depend on a ratio of the frequency of the operation start time, the operation end time, or the operation period length, with respect to the number of operation periods used for calculating the frequency distribution. Moreover, the threshold value may depend on a ratio of the frequency with respect to an average frequency. For example, suppose that the automatic-start or -end determination processing is performed using, as the threshold value, a value corresponding to 20% with respect to the number of operation periods used for calculating the frequency distribution. In this case, when the number of operation periods is 100, the threshold value is 20. Similarly, when the number of operation periods is 1000, the threshold value is 200. In this way, the threshold value is set according to the ratio, and thus can be varied depending on the number of operation periods.

Accordingly, this method can perform the automatic-start and -end determination processing which is not influenced by the number of operation periods and the measurement period of time closely related to the number of operation periods.

The status determination unit 106 stores the result of the determination as to the automatic start and end, into the item 710 of the operation period information shown in FIG. 9A for each of the operation periods stored in the operation information storage unit 105. Moreover, the status determination unit 106 stores a result of compiling the determination results for each of the electrical appliances 1006, into the appliance information storage unit 107. FIG. 13 shows an example of the complied result. An item 1301 indicates the appliance ID, and an item 1302 indicates a duration for which the automatic-start and -end determination processing is performed. An item 1303 indicates the number of operation periods included in the duration specified in the item 1302. An item 1304 indicates the number of operation periods determined as occurring periodically, such as the same day of the week, everyday, or every other day as mentioned above, among the operation periods indicated in the item 1303. An item 1305 indicates the number of automatically-started operation periods, and an item 1306 indicates the number of automatically-ended operation periods. An item 1307 indicates an average value and standard deviation of the operation period lengths. An item 1308 indicates an additional value of top three frequency percentages (%), among the frequencies of the operation period lengths in the calculated distribution. From the item 1307, the distribution width of the operation periods can be understood. More specifically, when the standard deviation is smaller, the distribution of the operation periods is narrower. In other words, when the standard deviation is larger, the distribution of the operation periods is wider. From the item 1308, the distribution width which cannot be calculated from the standard deviation indicated in the item 1307 can be understood. In (c) in FIG. 12, for example, the frequencies of the two operation period lengths, which are largely different, are high. In this case, although the distribution is determined as being wide from the standard deviation, the value indicated in the item 1308 is large. Thus, it is determined that a plurality of narrow distributions are present. In the item 1307, the distribution width of the operation period lengths is represented by the standard deviation. However, instead of or in addition to the standard deviation, the number of operation period lengths whose frequencies are equal to or higher than a predetermined value may be used to determine the distribution width.

As shown in FIG. 13, the washing machine with the application ID "1" has a small standard deviation in the operation period lengths as indicated in the item 1307 and also has an extremely narrow distribution width as indicated in the item 1308. Hence, all the operation periods are determined as ending automatically. On the other hand, the video recorder with the application ID "2" has many days exhibiting periodicity as indicated in the item 1304. Also, as indicated in the items 1305 and 1306, the operation periods determined as starting and ending automatically occupy approximately 40% of all the operation periods. Moreover, the item 1307 of the video recorder indicates a large standard deviation in the operation period length. Furthermore, as indicated in the item 1308, the additional value of the top three frequency percentages is not so high. Hence, it can be understood that an operation period where the video recorder is manually operated is included.

Figure 14:
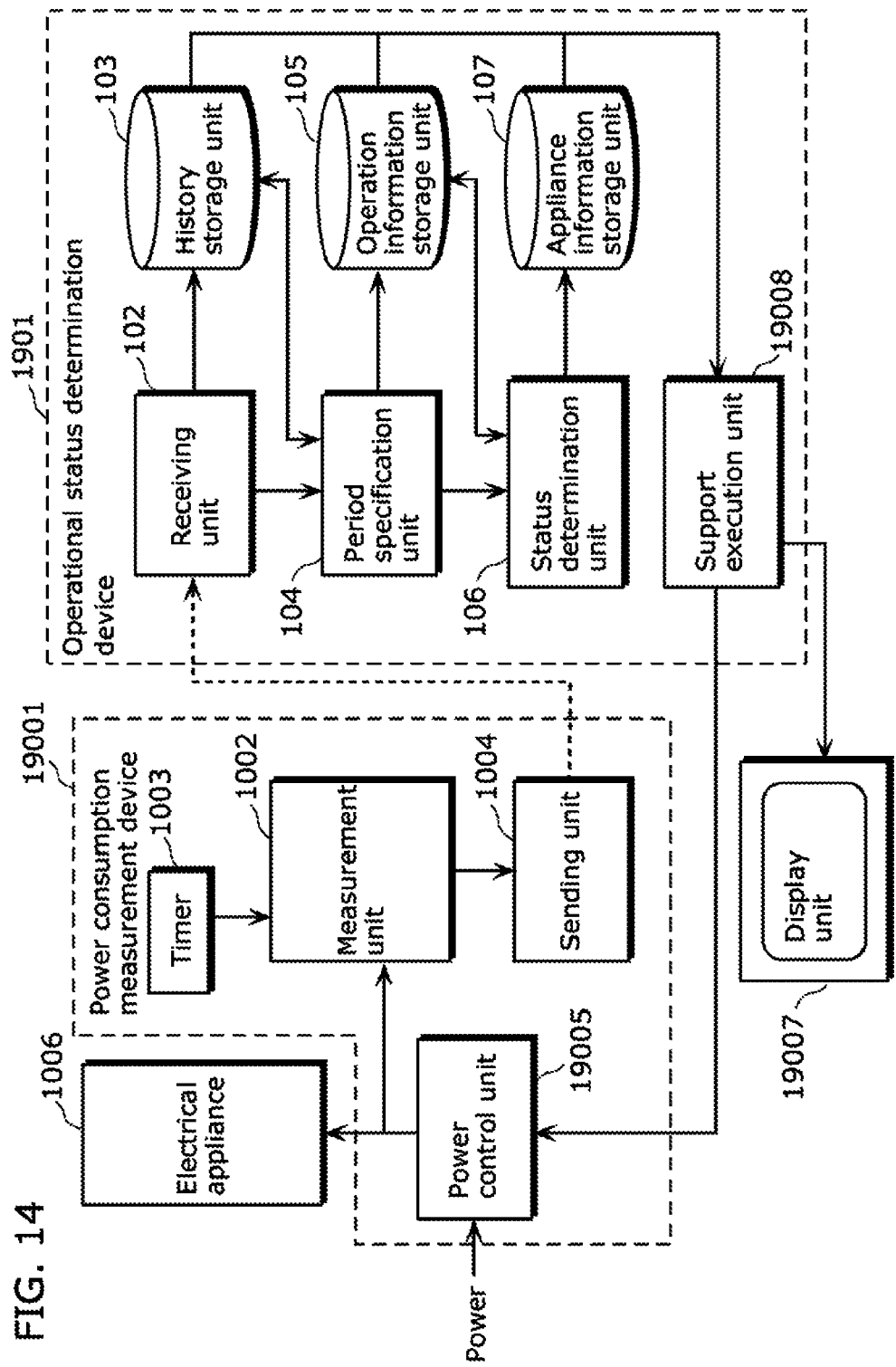
FIG. 14 is a block diagram showing each functional configuration of a power consumption measurement device and an operational status determination device both included in an energy-saving support system in the embodiment according to the present invention.

Here, an energy-saving support system as shown in FIG. 14 may be configured by adding a support execution unit 19008, a display unit 19007, and a power control unit 19005 to the energy-saving support system shown in FIG. 3.

The energy-saving support system shown in FIG. 14 includes a power consumption measurement device 19001, an operational status determination device 1901, and the display unit 19007.

The power consumption measurement device 19001 includes the power control unit 19005 in addition to the components included in the power consumption measurement device 1001 shown in FIG. 3.

The operational status determination device 1901 includes the support execution unit 19008 in addition to the components included in the operational status determination device 101 shown in FIG. 13.

The power control unit 19005 is connected between a power source and a power plug of the electrical appliance 1006, and thus can disconnect power supply to the electrical appliance 1006.

The support execution unit 19008 executes energy-saving support on the basis of the result of the determination made by the status determination unit 106. For example, the support execution unit 19008 executes energy-saving support, such as disconnecting a main power supply, when the electrical appliance 1006 which does not start operating automatically is in the standby state, that is, the state where the electrical appliance 1006 consumes less than the predetermined amount of power in the predetermined period of time. The following describes the energy-saving support to reduce the standby power consumption. When the power to the electrical appliance 1006 which starts operating automatically is disconnected to reduce the standby power consumption, the function, such as a timer recording, desired by the user cannot be executed. On this account, the present support method is based on the idea that the power disconnection is performed only on the appliance which is manually started. The support execution unit 19008 extracts, from the information stored in the appliance information storage unit 107, the electrical appliance 1006 which has no automatically-started operation period. Suppose that the support execution unit 19008 determines, from the result of the power consumption measurement stored in the history storage unit 103, that the operation of the extracted electrical appliance 1006 is finished. In this case, the support execution unit 19008 sends, to the power control unit 19005, a signal requesting to disconnect the power to the extracted electrical appliance 1006 which has no automatically-started operation period. The power control unit 19005 may be included in the power consumption measurement device 19001 as shown in FIG. 14, or may be provided as a separate module. Moreover, the power may be manually turned back on by the user. Alternatively, the support execution unit 19008 may estimate, from the usage of the current electrical appliance 1006 stored in the operation information storage unit 105, a time of day around which the electrical appliance 1006 is to be used, and perform control so that the power is turned back on around the estimated time of day.

With the above method, the power is automatically disconnected according to the determination made by the operational status determination device 1901. However, the user may suggest to disconnect the power. To be more specific, the support execution unit 19008 specifies the electrical appliance 1006 which has no automatically-started operation period and then causes the display unit 19007 to display a message indicating to disconnect the power to the specified electrical appliance 1006 after use. Here, since the support execution unit 19008 remembers the appliance ID instead of the name of the appliance, this appliance ID needs to be changed into the appliance name in the message displayed to the user. For doing so, the user may enter beforehand, into the operational status determination device 1901, the power consumption measurement device 1001 in association with the electrical appliance 1006. Alternatively, the operational status determination device 1901 may estimate the appliance name from the result of the power consumption measurement.

The following describes an example of the method for estimating the name of the target electrical appliance 1006 from the result of the power consumption measurement. The support execution unit 19008 compares a table indicating characteristics of the electrical appliances 1006 as shown in FIG. 15 with the information of the electrical appliances 1006 stored in the appliance information storage unit 107, to determine a correspondence between the appliance ID and the appliance name. In FIG. 15, an item 1101 indicates the appliance name, and items 1102 to 1106 indicate characteristics of the appliance whose name is indicated in the item 1101. An item 1102 indicates an operation start status, and an item 1103 indicates an operation end status. When the electrical appliance 1006 is operated only manually, the items 1102 and 1103 indicate "Manual". When the electrical appliance 1006 operates only automatically, the items 1102 and 1103 indicate "Automatic". When the electrical appliance 1006 is operated manually and automatically, the items 1102 and 1103 indicate "Manual/Automatic". An item 1104 indicates the number of times that low power consumption occurs, as explained above in the case of the item 709 shown in FIG. 9A. In FIG. 15, the item 1104 indicates not only the presence or absence of the low power consumption, but also whether the low power consumption occurs in a first or latter half or entire of the operation period. An item 1105 indicates a distribution manner of the operation period lengths and is associated with the information indicated in the items 1307 and 1308 shown in FIG. 13. An item 1106 indicates a standard period length of the appliance. Here, the appliance name can be determined by associating this standard period length with the distribution manner of the operation period lengths.

For example, the name of the electrical appliance 1006 with the appliance ID "1" shown in FIG. 13 is determined as follows. This electrical appliance 1006 is started manually and ends automatically. Moreover, the standard deviation of the electrical appliance 1006 is 7.3, meaning that the distribution of the operation periods is narrow. Thus, according to the table shown in FIG. 15, the appliance name is "Washing machine" for which: the item 1102 indicates "Manual"; the item 1103 indicates "Automatic"; and the item 1105 indicates "Narrow". By additionally using the items 1104 and 1106, the appliance name can be determined with accuracy. In order to make such a determination, the number of times that low power consumption occurs and the standard period length may be calculated beforehand and may be stored in the complied result shown in FIG. 13.

Figure 16:
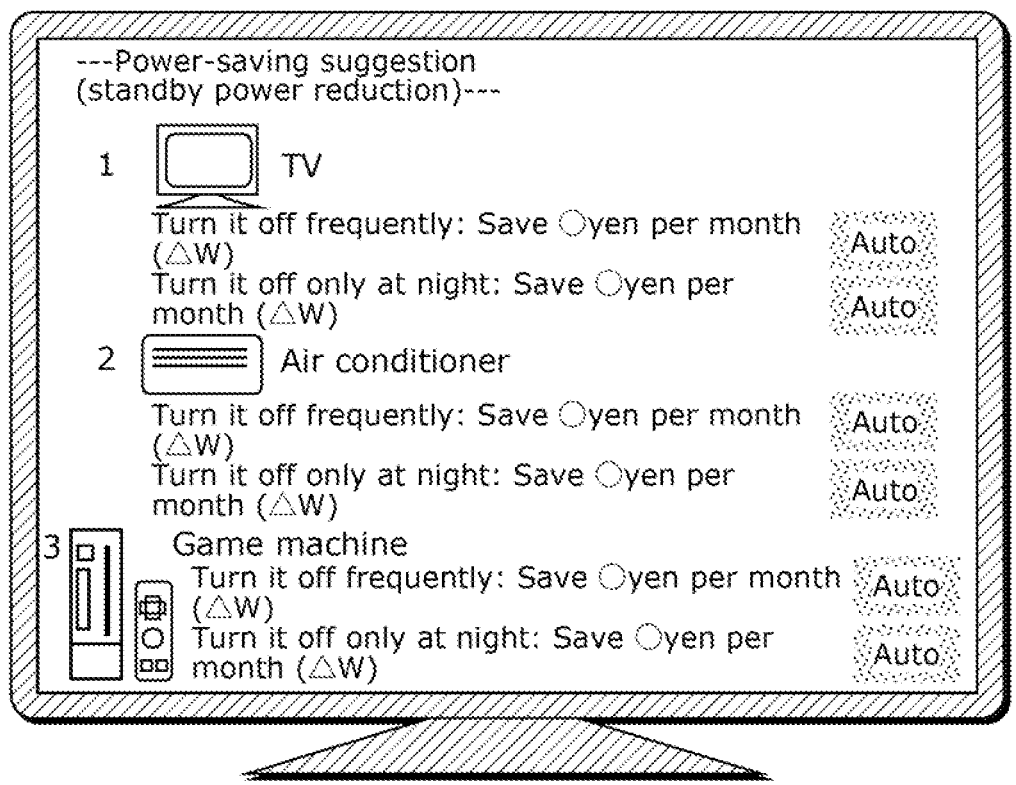
FIG. 16 is a diagram showing a specific example of a display screen created by a support execution unit to implement the energy-saving support.

The support execution unit 19008 causes the display unit 19007 to display the message suggesting to the user, using the estimated appliance name, that the power is to be disconnected, as shown in FIG. 16 for example. The display example in FIG. 16 shows top three appliances whose standby power consumptions are large and can be reduced by the power disconnection, among the appliances which do not automatically start or end operating. Moreover, whenever the operation period ends, the support execution unit 19008 calculates each amount of power consumptions to be reduced in the cases: where the power is disconnected based on the operation information stored in the operation information storage unit 105; and where the power is disconnected only after the end of the last operation period at night. The support execution unit 19008 presents the result of the calculations to the user. Here, an "Automatic" button may be displayed. By pressing the "Automatic" button, the user does not need to disconnect the power. That is, on behalf of the user, the operational status determination device 1901 disconnects the power. More specifically, in response to the press of the button, the operational status determination device 1901 automatically disconnects the power to the target electrical appliance 1006 after the end of the operation period. Note that FIG. 16 shows only the appliances which do not start operating automatically. This can prevent the case where the power to the appliance starting operating automatically is disconnected and the function desired by the user cannot be executed.

As described thus far, the operational status determination device in the present embodiment calculates the frequency distributions of: the operation start times; the operation end times; and the operation period lengths, using the operation history of the appliance. On the basis of the frequency distributions, whether or not the appliance operates automatically can be determined. Moreover, using the result of the determination, an energy-saving system can be configured according to the operational status of the appliance.

(First Modification)

In the above embodiment, the status determination unit 106 performs the automatic-start and -end determination processing using the frequency distributions of: the operation start times, the operation end times, and the operation period lengths. Here, suppose that each of the operation start or end times is represented by a string of a form hh:mm:ss. When the operation start times and end times are characterized by a time unit in the string representing these times, the determination can be made using these characteristics. FIG. 17 shows an example of the frequency information for every minute of the hour. This frequency information is referred to as the minute-specific frequency information. By transforming the time-specific frequency distribution as shown in FIG. 11 into the distribution using a certain time unit as shown in FIG. 17 (minutes, in the present example), the distributed frequencies of the operation start times can be summarized. With this, the automatic-start and -end determination processing can be performed with a higher degree of accuracy. For example, in FIG. 17, the number of operation periods starting at "00" minutes, that is, starting on the hour, is 57 and the number of operation periods ending at "00" minutes is 0. Suppose that an automatic operation always starts on the hour. In this case, by calculating the frequency of the operation start time represented by the time unit indicating minutes of the operation start time, i.e., from 00 to 59, instead of the whole time string indicating the time of day, the frequency of "00" minutes increases as compared with the frequencies of the other minutes of the hour.

Figure 18:
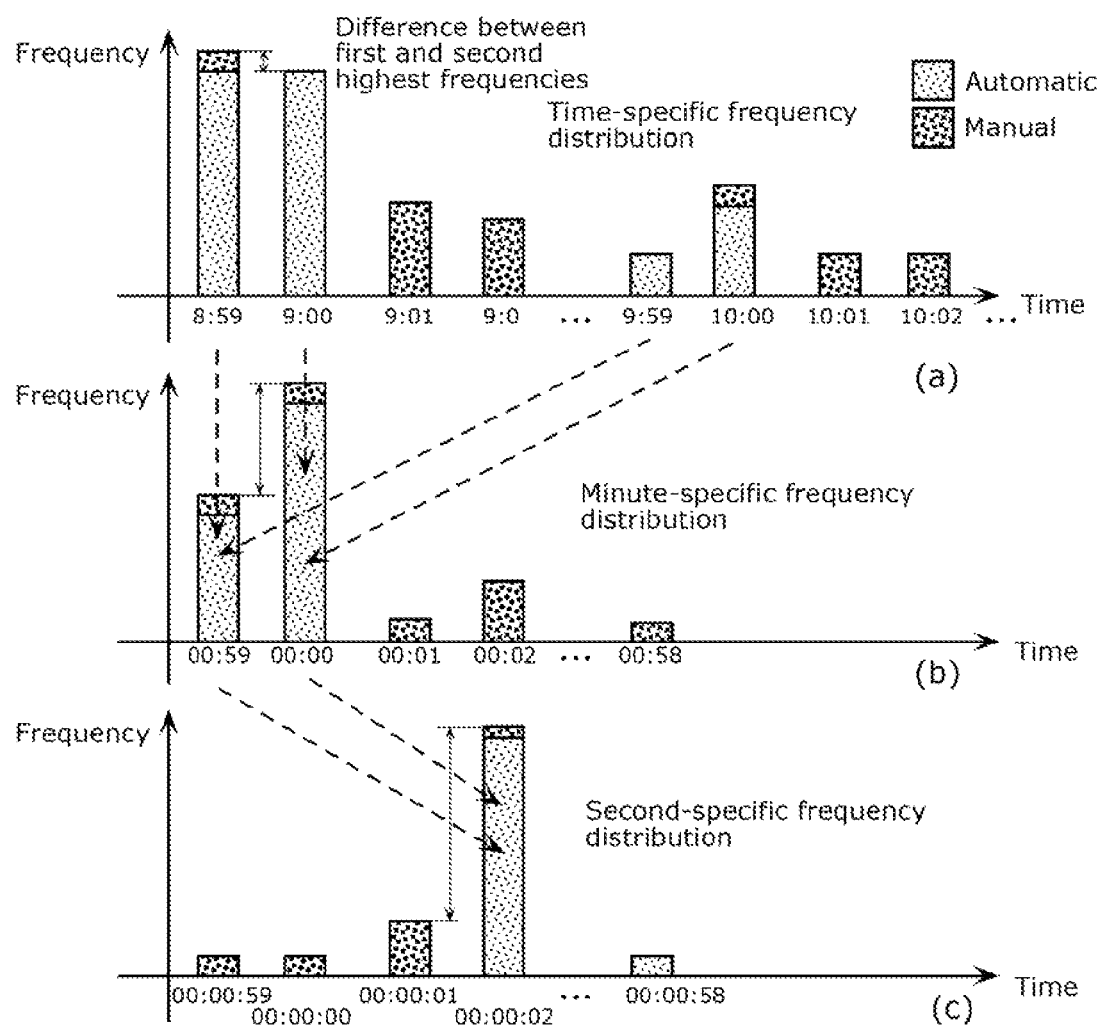
FIG. 18 is a diagram showing a specific example of changes in occurrence frequency distributions as a result of changes in a time unit used in frequency information stored in the operation information storage unit in the first modification of the present embodiment according to the present invention.

A more specific explanation is given, using the case of the video recorder as an example. Suppose that the user sets timer recordings to record: a drama aired at 9:00 on Monday; a variety show aired at 8:59 on Tuesday; a drama aired at 10:00 on Wednesday; and a movie aired at 9:59 on Sunday. Here, note that: the drama on Monday and the variety show on Tuesday are aired every week; the drama on Wednesday is aired every other week and, more specifically, aired only twice a month; and the movie on Sunday is aired only once. In FIG. 18, (a) shows an example of the result of measuring operation periods for a few months and calculating time-specific frequencies of the operation start times. As shown in (a) of FIG. 18, since the aforementioned TV programs are recorded on every Monday and every Tuesday, each of the corresponding frequencies of 9:00 and of 8:59 is high. On the other hand, since the drama on Wednesday is aired every other week and the movie is aired only once, each of the corresponding frequencies of 10:00 and of 9:59 is low. For this reason, it is difficult to distinguish these frequencies of 10:00 and 9:59 from those of the other operation start times at which the operations are started manually. To address this, (b) of FIG. 18 shows an example of the result of calculating the frequency of the operation start time represented by a time unit indicating minutes in the time string. This frequency calculation is based on the fact that currently-aired TV programs basically start at the same minutes of the hour. By calculating the frequencies of the minutes in the time string, the low frequencies of 9:59 and 10:00 are included in the frequencies of 8:59 and 9:00, respectively. Accordingly, it is determined that the operation periods of the timer recordings executed from 9:59 and from 10:00 are started automatically.

Moreover, (c) of FIG. 18 shows an example of the result of calculating the frequency of the operation start time represented by a time unit indicating seconds in the time string, i.e., from 00 to 59. This frequency calculation is based on the fact that although the timer recording to be executed by the video recorder is set by the minute, the operation start times to record the TV programs, i.e., the times when the video recorder is activated are basically at the same seconds of the hour. By calculating the frequency of the time unit indicating the seconds of the time string, the frequencies of "00:59" minutes and of "00:00" minutes are included in the frequency of "00:00:02" seconds. Accordingly, it is determined more reliably that the operation periods of the timer recordings executed from 9:59 and from 10:00 are started automatically. In (c) of FIG. 18, the operation start time of the video recorder is assumed to be "00:00:02" seconds. However, this start time depends on the individual appliance and on the time setting of the power consumption measurement device.

In this way, without using the aforementioned periodicity, the automatic-start and -end determination can be made using the time unit smaller than the time unit which is settable in the case of the automatic operation. For example, when it is understood that the operation starts at "00:00:02" as shown in (c) of FIG. 18, this operation can be determined as starting automatically, regardless of the frequency distribution or what hour and what minute of the hour are set in the current timer recording. Note that the time unit used for the automatic-start and -end determination varies among the appliances. On this account, the time unit to be used for the determination may be stored beforehand in the information which is stored in the appliance information storage unit 107 as shown in FIG. 15.

In the case where the time unit to be used for the determination is unknown beforehand, the time unit may be obtained as follows. The time unit whose frequency is to be calculated is reduced to a smaller unit. Then, based on changes in the frequency distributions as a result of the reduction in the time unit, the time unit used for the determination can be obtained. More specifically, the frequencies of the operation start or end times are calculated, with the time unit being changed sequentially as follows. That is, the calculations are sequentially performed to obtain: the frequency of every ten minutes of the hour, i.e., 00:10, 00:20, 00:30, . . . ; then the frequency of every minute of the hour, i.e., 00:01, 00:02, 00:03 . . . ; and then the frequency of every second of the hour, i.e., 00:00:01, 00:00:02, 00:00:03 . . . . After this, the obtained frequency distributions are compared. The time unit may be reduced as above until, for example, a predetermined amount of increase or more is verified between elements, such as between time units indicating minutes and seconds, used for representing the operation start times. The predetermined amount of increase may be an increase in the frequency or an increase in the frequency ratio with respect to all the frequencies or the average frequency. Furthermore, the frequency to be recalculated after the reduction in the time unit may be the highest frequency in the distribution. Moreover, information on a difference between the first and second highest frequencies may be used. To be more specific, the time unit may be reduced until the difference between the first and second highest frequencies is increased by a predetermined value or more. Furthermore, the determination whether to reduce the time unit may be made based on whether some of the top frequencies are increased as a result of the reduction in the time unit. Note that, when the frequencies are calculated, the following conditions may be satisfied: that the number of operation periods used for calculating the frequency distribution is a predetermined number or more; and that the highest frequency has a predetermined ratio or more with respect to the total number of operation periods.

It should be noted that the status determination unit 106 may determine whether or not the operation period starts automatically, based on the operation start time occurring with a frequency having a predetermined ratio or more with respect to a predetermined value or the total frequencies, among the operation start times specified by the period specification unit 104.

Moreover, it should be noted that, according to the present method, there may be the case where automatic and manual operations are determined as starting by coincidence at the same start time represented by the current time unit used for calculating the frequency distribution. In this case, these automatic and manual operations are counted in the same frequency, and this means that the ratio of the automatic operations is increased. Thus, a rate of detecting the automatic operation is accordingly increased. Moreover, an increase in the number of kinds of time units, as in the case where the time unit represented by the seconds is reduced to a time unit represented by milliseconds, reduces the number of manual operations counted in the frequency of the automatic operations. Thus, whether the operation is automatically started can be determined with a higher degree of accuracy.

(Second Modification)

Conventionally, a timer recording by a video recorder is set by specifying a time of day. In recent years, however, the timer recording is set using an Electronic Program Guide (EPG) in most cases. The EPG includes information on start and end times of TV programs, and the information in the EPG can be obtained through a broadcast wave or the Internet. Hereafter, this information in the EPG is referred to as the EPG data. Hence, when the appliance is the video recorder, the status determination unit 106 may use the EPG data to determine whether the operation period starts and ends automatically. For example, when determining whether or not the operation period starts automatically, the status determination unit 106 may compare the operation start time of the operation period with the EPG data. When the EPG data includes a TV program starting at the same time as the current operation start time, the status determination unit 106 determines that the current operation period starts automatically. Alternatively, the minute-specific frequency distribution of the appliance is calculated using the start times included in the EPG data corresponding to a predetermined period of time. Then, regarding the element (minutes of the hour in this case) whose frequency is 0 in the calculated distribution, the status determination unit 106 determines that no operation period starts automatically at this start time.

(Third Modification)

In the above embodiment, the support execution unit 19008 sends the signal requesting to disconnect the power to the electrical appliance 1006 which does not automatically start operating, so as to execute the energy-saving support by reducing the standby power consumption. In addition to this processing to reduce the standby power consumption, the support execution unit 19008 may determine whether the user forgot to turn OFF the electrical appliance 1006 on the basis of the determination result of whether the electrical appliance 1006 automatically starts and ends. Then, the support execution unit 19008 may execute the energy-saving support by appropriately disconnecting the power to the electrical appliance 1006 which the user forgot to turn OFF.

In order to control the power to the electrical appliance 1006 which the user forgot to turn OFF, the support execution unit 19008 performs off-line processing as shown in (a) of FIG. 19.

More specifically, the support execution unit 19008 extracts an operation period which is not automatically started or ended, from the operation history of the plurality of electrical appliances 1006 stored in the operation information storage unit 105 (S1601). Note that the determination as to whether the operation period is automatically started or ended is made using the determination result given by the status determination unit 106.

Based on the extracted operation period, the support execution unit 19008 extracts master and slave appliances (S1602). Here, the master and slave appliances refer to a pair of appliances which operate at the same time. That is, the operation periods of these appliances overlap each other.

The support execution unit 19008 determines a master-slave relationship between the pair of the appliances determined as being the master and slave appliances (S1603). When the power of the appliance determined as being the slave, namely, the slave appliance, is OFF, the power of the appliance determined as being the master, namely, the master appliance, does not necessarily need to be OFF. However, when the power of the master appliance is OFF, the power of the slave appliance needs to be OFF. In other words, the slave appliance is used in conjunction with the master appliance and thus is not used alone. It should be noted that, in the present example, the power-OFF state includes the cases where the power is disconnected and where the appliance is in the standby state. For example, based on the temporal relationship between the operation periods of the master and slave appliances, the support execution unit 19008 specifies the master appliance used alone and the slave appliance used in conjunction with this master appliance. More specifically, the support execution unit 19008 determines whether the respective operation start and end times indicated by the overlapping operation periods of these appliances agree with a predetermined pattern of respective operation start and end times of master and slave appliances. As a result, each of the master and slave appliances is specified from the pair. An example of the predetermined pattern is as follows. The operation start time of the slave appliance is present within a first period of time after the operation start time of the master appliance, and the operation end time of the slave appliance is present within a second period of time after the operation start time of the master appliance. Note that the pattern is not limited to this.

The support execution unit 19008 stores the determined master and slave appliances and the determined master-slave relationship into the appliance information storage unit 107. FIG. 20 shows data, stored in the appliance information storage unit 107, which indicates the master and slave appliances and the master-slave relationships. An item 1501 indicates a number assigned to the pair determined as being the master and slave appliances. Items 1502 and 1503 indicate the master appliance and the slave appliance, respectively, which correspond to the pair number indicated in the item 1501.

On the basis of the master-slave relationship information as described, the support execution unit 19008 determines whether the user forgot to turn OFF the appliance, from the operational status of the current appliance and the information stored in the appliance information storage unit 107 that indicates whether or not the current appliance automatically starts and ends operating. The support execution unit 19008 executes the energy-saving support by controlling the power to the appliance which the user forgot to turn OFF. Here, (b) of FIG. 19 shows a flowchart of processing to implement the energy-saving support.

The support execution unit 19008 obtains the operational status of the electrical appliance 1006 currently in use, from the operation information storage unit 105 (S1604). Then, the support execution unit 19008 determines whether the obtained operational status indicates that the electrical appliance 1006 started operating automatically (S1605). Note that the determination as to whether the electrical appliance 1006 started operating automatically is made using the determination result given by the status determination unit 106.

When determining that the electrical appliance 1006 started operating automatically (YES in S1605), the support execution unit 19008 does not execute the energy-saving support. When determining that the electrical appliance 1006 did not start operating automatically (NO in S1605), the support execution unit 19008 next determines whether the user forgot to turn OFF the current electrical appliance 1006, i.e., the target appliance (S1606). For example, suppose that the target appliance is the slave appliance included in the pair determined as the master and slave appliances. In this case, when the power of the master appliance is OFF and the power of this slave appliance is ON, it is determined that the user forgot to turn OFF the slave appliance, namely, the target appliance (YES in S1606). Following this, the support execution unit 19008 performs control so that the target appliance which the user forgot to turn OFF is turned OFF (S1607 to S1609). More specifically, the support execution unit 19008 determines whether the target appliance which the user forgot to turn OFF starts operating automatically, based on the information stored in the appliance information storage unit 107 (S1607). When determining that the target appliance starts operating automatically (YES in S1607), the support execution unit 19008 performs control, as a power control method, so that the target appliance is in the standby state (S1609). To be more specific, the support execution unit 19008 sends, to the power control unit 19005, a signal requesting to place the target appliance in the standby state. On the other hand, when determining that the target appliance does not start operating automatically (NO in S1607), the support execution unit 19008 sends, to the power control unit 19005, a signal requesting to disconnect the power to the target appliance, as a power control method (S1608).

It should be noted that the support execution unit 19008 places the video recorder into the standby state during a period of time for which the timer recording is not set.

The operational status determination device in the present embodiment: determines, based on the history information on power consumption of the appliance, whether or not the appliance operates automatically; and, based on the determination result, executes the energy-saving support by reducing the standby power consumption of the appliance, such as the video recorder. Moreover, as in the present modification, it can be determined whether the user directly operates the appliance, based on the history information on the power consumption of the appliance and the information as to whether the appliance operates automatically.

(Fourth Modification)

The above embodiment and modifications have described the examples of reducing wasteful power consumption by using the result of the determination as to whether or not the electrical appliance 1006 operates automatically. That is, the operational status determination device determines the operational status of the electrical appliance 1006, based on the power consumption history of the electrical appliance 1006. Using the result of this determination, it can also be determined whether there is a problem in daily life of the user living in a house in which the electrical appliance 1006 is installed. Here, the problem refers to a rapid change in daily life of the user. The present modification determines this change, based on a result of measuring power consumption. To be more specific, in the case where the power consumption in a predetermined period of time is largely changed from a predetermined value or where a change per predetermined time unit is larger or smaller than a predetermined value, it is determined that there is a problem in daily life of the user. Examples of such a case include: the case where daily power consumption changes by a predetermined amount or more with respect to an average power consumption in a past certain period of time; and the case where, when the power consumption is hourly measured, hours during which the power consumption is large change by a predetermined hours or more.

The presence of a problem in daily life of the user can be determined using the power consumption history of, for example, an electric pot. To be more specific, the presence of the problem can be determined by detecting the number of uses from the power consumption history and then determining whether there is a predetermined change or more with respect to the normal number of uses. For example, suppose that although the electric pot is normally used a few times a day, it was not used at all yesterday. In such a case, it is determined that the user is more likely to have a problem.

In recent years, however, with the widespread use of electrical appliances having energy-saving functions, some electric pots have timer functions and can be turned ON and OFF automatically. When the electric pot has a timer function, the history of power consumption shows the regular changes in the power consumption. Thus, it may be determined that the user directly operates the electric pot when the user actually collapsed.

To address this, the operational status determination device according to the present invention determines whether the appliance starts operating automatically, to determine whether the appliance is directly operated by the user or operates by the timer function. Hence, the present device can determine whether there is a problem in daily life of the user, with a higher degree of accuracy as compared with a conventional determination device.

Figure 21:
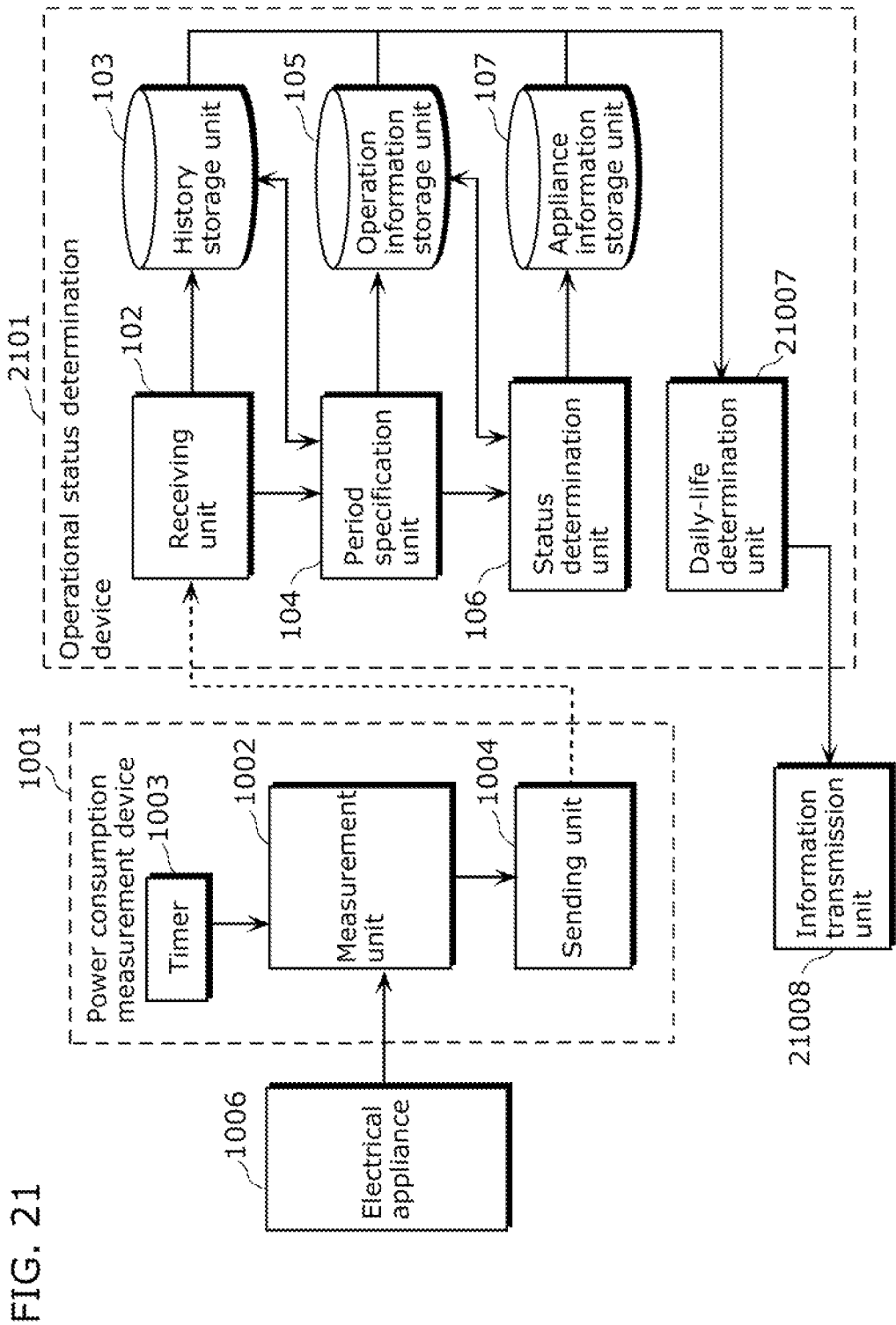
FIG. 21 is a block diagram showing each functional configuration of a power consumption measurement device and an operational status determination device both included in an energy-saving support system in a fourth modification of the present embodiment according to the present invention.

FIG. 21 is a diagram showing a configuration of an energy-saving support system in the present modification. The energy-saving support system includes a power consumption measurement device 1001, an operational status determination device 2101, and an information transmission unit 21008.

The operational status determination device 2101 includes a daily-life determination unit 21007 in addition to the components included in the operational status determination device 101 shown in FIG. 3.

The daily-life determination unit 21007 determines whether there is a problem in daily life of the user, using the appliance information stored in the appliance information storage unit 107 and the operation history of the appliance stored in the operation information storage unit 105. To be more specific, the daily-life determination unit 21007 makes this determination for each of the electrical appliances 1006, based on: the number of operation periods where the electrical appliance 1006 is manually started or manually ended; and the power consumption of the electrical appliance 1006. For example, when the number of operation periods where the electrical appliance 1006 is manually started or manually ended is smaller than a predetermined number or zero, the daily-life determination unit 21007 determines that there is a problem in daily life of the user. In such as case, the information transmission unit 21008 sends a message indicating that there is a problem, to a predetermined information receiving unit. When it is desired to monitor the daily life of the user, the information transmission unit 21008 may transmit information on the operational status and power consumption of the manually-operated appliance regardless of the presence or absence of a problem.

Moreover, the operational status determination device 2101 may additionally include a supervisory unit which appropriately specifies, based on the determination result given by the status determination unit 106, the electrical appliance 1006 to be monitored. On the basis of the operation history of the specified electrical appliance 1006, the daily-life determination unit 21007 determines the state of the user's daily life. For example, by reference to the power consumption histories of the electrical appliances 1006, the supervisory unit selects the electrical appliance 1006, as the appliance to be monitored, which is manually started by the user with a predetermined frequency or higher. The daily-life determination unit 21007 determines whether or not there is a problem in daily life of the user based only on the information on the selected electrical appliance 1006.

In this way, the usage frequency of the frequently-used electrical appliance 1006, among the electrical appliances 1006 which do not operate automatically according to the timer function or the like, is referenced. This allows the state of the user's daily life to be monitored with accuracy.

In the present embodiment, the power consumption history of the electrical appliance 1006 is used for determining whether or not the electrical appliance 1006 operates automatically. However, instead of the power consumption history, a history of electric current consumption of the electrical appliance 1006 may be used for the determination.

Moreover, in the present embodiment, the frequency or frequency ratio is compared with the threshold value to determine whether or not the appliance automatically starts or ends operating. However, this determination may be made by evaluating variation in the operation start time. For example, when a value representing the variance of the operation start time is a predetermined value or larger, the appliance may be determined as being started manually. When the value representing the variance is smaller than the predetermined value, the appliance may be determined as starting operating automatically.

Also, to be more specific, each of the above-described devices may be a computer system configured with a microprocessor, a ROM, a RAM, a hard disk drive, a display unit, a keyboard, a mouse, and so forth. The RAM or the hard disk drive stores computer programs. The microprocessor operates according to the computer programs, so that the functions of the components included in the computer system are carried out. Here, note that a computer program includes a plurality of instruction codes indicating instructions to be given to the computer so as to achieve a specific function.

Moreover, some or all of the components included in each of the above-described devices may be realized as a single system Large Scale Integration (LSI). The system LSI is a super multifunctional LSI manufactured by integrating a plurality of components onto a signal chip. To be more specific, the system LSI is a computer system configured with a microprocessor, a ROM, a RAM, and so forth. The RAM stores computer programs. The microprocessor operates according to the computer programs, so that the functions of the system LSI are carried out.

Furthermore, some or all of the components included in each of the above-described devices may be implemented as an IC card or a standalone module that can be inserted into and removed from the corresponding device. The IC card or the module is a computer system configured with a microprocessor, a ROM, a RAM, and so forth. The IC card or the module may include the aforementioned super multifunctional LSI. The microprocessor operates according to the computer programs, so that the functions of the IC card or the module are carried out. The IC card or the module may be tamper resistant.

Also, the present invention may be the methods described above. Each of the methods may be a computer program implemented by a computer, or may be a digital signal of the computer program.

Moreover, the present invention may be the aforementioned computer program or digital signal recorded onto a computer-readable recording medium, such as a flexible disk, a hard disk, a CD-ROM, an MO, a DVD, a DVD-ROM, a DVD-RAM, a Blu-ray Disc (BD) (registered trademark), and a semiconductor memory. Also, the present invention may be the digital signal recorded onto these recording medium.

Furthermore, the present invention may be the aforementioned computer program or digital signal transmitted via a telecommunication line, a wireless or wired communication line, a network represented by the Internet, and data broadcasting.

Also, the present invention may be a computer system including a microprocessor and a memory. The memory may store the aforementioned computer program and the microprocessor may operate according to the computer program.

Moreover, by transferring the recording medium having the aforementioned program or digital signal recorded thereon or by transferring the aforementioned program or digital signal via the aforementioned network or the like, the present invention may be implemented by an independent different computer system.

Furthermore, the above embodiment and modifications may be combined.

Although only an exemplary embodiment of this invention has been described in detail above, those skilled in the art will readily appreciate that many modifications are possible in the exemplary embodiment without materially departing from the novel teachings and advantages of this invention. Accordingly, all such modifications are intended to be included within the scope of this invention.

INDUSTRIAL APPLICABILITY

The present invention is applicable to an operational status determination device or the like which supports energy saving of an electrical appliance.

What is claimed is:

1. An operational status determination device comprising:
a receiving unit configured to receive data on power consumption of an appliance, the power consumption being measured at predetermined time intervals;
a specification unit configured to specify operation start times of the appliance, based on the power consumption data received by said receiving unit, the operation start times occurring in a period of time; and
a determination unit configured to determine whether or not the appliance starts operating automatically, based on each of occurrence frequencies of the operation start times specified by said specification unit.

2. The operational status determination device according to claim 1,
wherein, when the occurrence frequency of the operation start time occurring in the period of time is equal to or higher than a start frequency threshold, said determination unit is configured to determine that the appliance starts operating automatically.

3. The operational status determination device according to claim 1,
wherein, when a frequency distribution of the operation start times includes an operation start time whose occurrence frequency ratio with respect to a total of the occurrence frequencies is equal to or higher than a start ratio threshold, said determination unit is configured to determine that the appliance starts operating automatically.

4. The operational status determination device according to claim 1,
wherein said specification unit is further configured to specify operation end times of the appliance, based on the power consumption data received by said receiving unit, the operation end times occurring in the period of time, and
said determination unit is further configured to determine whether or not the appliance ends operating automatically, based on each of occurrence frequencies of the operation end times specified by said specification unit.

5. The operational status determination device according to claim 4,
wherein, when the occurrence frequency of the operation end time occurring in the period of time is equal to or higher than an end frequency threshold, said determination unit is configured to determine that the appliance ends operating automatically.

6. The operational status determination device according to claim 4,
wherein, when a frequency distribution of the operation end times includes an operation end time whose occurrence frequency ratio with respect to a total of the occurrence frequencies is equal to or higher than an end ratio threshold, said determination unit is configured to determine that the appliance ends operating automatically.

7. The operational status determination device according to claim 4,
wherein said determination unit is configured to:
determine, from the frequency distribution of the operation start times of the appliance, whether operation periods starting at a same operation start time occur periodically in the period of time and, when the operation periods are determined as occurring periodically, determine that the appliance starts operating automatically; and
determine, from the frequency distribution of the operation end times of the appliance, whether operation periods ending at a same operation end time occur periodically in the period of time and, when the operation periods are determined as occurring periodically, determine that the appliance ends operating automatically.

8. The operational status determination device according to claim 4, further comprising
a daily-life determination unit configured to determine whether or not there is a problem in daily life of a user living in a house where the appliance is installed, based on at least one of the number of automatically-started operations of the appliance in a predetermined period of time and the number of automatically-ended operations of the appliance in the predetermined period of time.

9. The operational status determination device according to claim 1,
wherein said specification unit is further configured to specify lengths of operation periods of the appliance, based on the power consumption data received by said receiving unit, the operation periods occurring in the period of time, and
said determination unit is further configured to determine that the appliance ends operating automatically, when a frequency distribution of the operation period lengths includes an operation period length whose occurrence frequency ratio with respect to a total of occurrence frequencies of the operation period lengths is equal to or higher than an end ratio threshold.

10. The operational status determination device according to claim 4, further comprising
a support execution unit configured to output a signal for supporting power control of the appliance, based on a result of the determination made by said determination unit.

11. The operational status determination device according to claim 9, further comprising
a support execution unit configured to (i) estimate a type of the appliance by comparing a table stored in a memory beforehand and a result of the determination made by said determination unit, the table including, for each type of the appliance, information on whether the appliance starts operating automatically and information on the frequency distribution of the operation period lengths of the appliance, and (ii) output a signal for supporting power control of the appliance according to the estimated type, based on the result of the determination made by said determination unit.

12. The operational status determination device according to claim 10, wherein said support execution unit is configured to output a signal for disconnecting power to the appliance determined by said determination unit as not starting operating automatically.

13. The operational status determination device according to claim 10, wherein the appliance is a video recorder which operates according to a timer recording set to record a television program.

14. The operational status determination device according to claim 13,
wherein the signal for supporting the power control of the appliance is outputted from said support execution unit to control power to the video recorder, and
said support execution unit is configured to place the video recorder into a standby state during a period of time for which the timer recording is not set.

15. The operational status determination device according to claim 1, wherein said determination unit is configured to determine whether or not the appliance starts operating automatically, based on a frequency distribution of the operation start times specified by said specification unit, each of the operation start times being represented by a predetermined time unit obtained from the operation start times.

16. The operational status determination device according to claim 15, wherein the appliance uses an electronic program guide, and the predetermined time unit representing each of the operation start times is a value indicating minutes of the operation start time or seconds of the operation start time.

17. The operational status determination device according to claim 15, wherein the predetermined time unit is smaller than a minimum time unit settable to cause the appliance to start operating automatically.

18. The operational status determination device according to claim 15,
wherein, when the operation start times in the period of time include an operation start time whose occurrence frequency or whose frequency ratio with respect to a total of the occurrence frequencies is increased by a predetermined value or more as a result of a reduction in a time unit representing the operation start time, said determination unit is configured to use a reduced time unit as the predetermined time unit.

19. The operational status determination device according to claim 18,
wherein, when a highest occurrence frequency among the occurrence frequencies of the operation start times or a ratio of the highest occurrence frequency with respect to the total of the occurrence frequencies is increased by the predetermined value or more as the result of the reduction in the time unit, said determination unit is configured to use the reduced time unit as the predetermined time unit.

20. The operational status determination device according to claim 15,
wherein, when a difference in the occurrence frequency between predetermined elements each representing the operation start time is increased by a predetermined value or more as a result of a reduction in a time unit, said determination unit is configured to use a reduced time unit as the predetermined time unit.

21. The operational status determination device according to claim 20, wherein, when a difference between a first highest occurrence frequency and a second highest occurrence frequency of the operation start times, among the operation start times in the period of time, is increased by the predetermined value or more as the result of the reduction in the time unit, said determination unit is configured to use the reduced time unit as the predetermined time unit.

22. The operational status determination device according to claim 15, wherein said determination unit is configured to determine whether or not the appliance starts operating automatically, based on an operation start time, among the operation start times specified in the period of time, whose occurrence frequency ratio with respect to a total of the occurrence frequencies is equal to or higher than a predetermined ratio.

23. The operational status determination device according to claim 10, wherein said support execution unit is further configured to specify, among a plurality of appliances, a master appliance operating alone and a slave appliance operating in conjunction with the master appliance, based on a temporal relationship between overlapping operation periods of the appliances, the overlapping operation periods not starting or ending automatically.

24. The operational status determination device according to claim 23, wherein, when the master appliance is OFF and the slave appliance is ON, said support execution unit is configured to send a signal for turning OFF the slave appliance.

25. The operational status determination device according to claim 24, wherein, when the slave appliance is an appliance that starts operating automatically, said support execution unit is configured not to send the signal for turning OFF the slave appliance.

26. The operational status determination device according to claim 24, wherein, when the slave appliance is an appliance that starts operating automatically, said support execution unit is further configured to send a signal for reducing power consumption of the slave appliance in a period where the slave appliance is capable of starting operating automatically.

27. The operational status determination device according to claim 1, further comprising a daily-life determination unit configured to determine that there is a problem in daily life of a user living in a house where the appliance is installed, when it is determined, from a result of the determination made by said determination unit, that the appliance does not operate except when operating automatically.

28. The operational status determination device according to claim 27,
wherein said receiving unit is configured to receive power consumption data on a plurality of appliances,
said specification unit is configured to specify operation start times for each of the appliances, based on the power consumption data received by said receiving unit, the operation start times occurring in the period of time,
said determination unit is configured to determine, for each of the appliances, whether or not the appliance starts operating automatically, based on each of occurrence frequencies of the operation start times specified by said specification unit,
said operational status determination device further comprises
a supervisory unit configured to specify, among the appliances, an appliance to be monitored, based on a result of the determination made by said determination unit, and
said daily-life determination unit is configured to determine whether there is a problem in the daily life of the user, based on a result of the determination made by said determination unit regarding the appliance specified to be monitored by said supervisory unit.

29. The operational status determination device according to claim 28, wherein said supervisory unit is configured to specify the appliance to be monitored, when the result of the determination made by said determination unit indicates that an occurrence frequency of non-automatic operations of the appliance is equal to or higher than a predetermined value.

30. The operational status determination device according to claim 1,
wherein the appliance uses an electronic program guide, and
said determination unit is configured to determine that the appliance starts operating automatically, when an operation start time, among the operation start times specified in the period of time, is identical to a start time of a television program indicated in the electronic program guide.

31. An operation status determination method comprising:
receiving a value, as power consumption data, from which power consumption of an appliance is derivable, the power consumption being measured at predetermined time intervals;
specifying operation start times of the appliance, based on the power consumption data received in said receiving, the operation start times occurring in a period of time; and
determining whether or not the appliance starts operating automatically, based on each of occurrence frequencies of the operation start times specified in said specifying.

32. A non-transitory computer-readable recording medium for use in a computer, the recording medium having a computer program recorded thereon for causing the computer to execute:
receiving a value, as power consumption data, from which power consumption of an appliance is derivable, the power consumption being measured at predetermined time intervals;
specifying operation start times of the appliance, based on the power consumption data received in said receiving, the operation start times occurring in a period of time; and
determining whether or not the appliance starts operating automatically, based on each of occurrence frequencies of the operation start times specified in said specifying.

* * * * *